United States Patent [19]

Naitoh et al.

[11] Patent Number: 5,933,577

[45] Date of Patent: Aug. 3, 1999

[54] METHOD AND APPARATUS FOR PROCESSING COLOR IMAGES

[75] Inventors: Koichi Naitoh; Takao Koike, both of Ebina, Japan

[73] Assignee: Fuji Xerox Co., Ltd., Tokyo, Japan

[21] Appl. No.: 08/692,668

[22] Filed: Aug. 6, 1996

Related U.S. Application Data

[63] Continuation of application No. 08/314,686, Sep. 29, 1994, abandoned.

[30] Foreign Application Priority Data

Oct. 4, 1993 [JP] Japan .................................. 5-248178

[51] Int. Cl.⁶ .................................................. G06F 15/00
[52] U.S. Cl. ........................................... 395/109; 358/512
[58] Field of Search ..................... 395/101, 102, 395/106, 109, 110, 117; 345/416, 426, 427, 428, 431, 432, 144; 707/500, 518, 524, 528; 382/254, 255, 258, 263, 266, 267, 268, 269, 274, 275

[56] References Cited

U.S. PATENT DOCUMENTS

| | | | |
|---|---|---|---|
| 4,595,948 | 6/1986 | Itoh et al. ............................... | 358/535 |
| 5,008,742 | 4/1991 | Shigaui et al. .......................... | 358/529 |
| 5,031,034 | 7/1991 | Shimizu et al. ......................... | 358/529 |
| 5,428,377 | 6/1995 | Stoftel et al. ........................... | 358/518 |

FOREIGN PATENT DOCUMENTS

| | | |
|---|---|---|
| B2-62-11781 | 3/1987 | Japan . |
| A-3-41171 | 2/1991 | Japan . |
| A-4-325574 | 11/1992 | Japan . |
| A-4-355157 | 12/1992 | Japan . |
| A-4-364961 | 12/1992 | Japan . |

OTHER PUBLICATIONS

Tappi's Pulp and Paper Test Method No. 51–87 (9 pgs.).

Primary Examiner—Scott Rogers
Assistant Examiner—Gabriel I. Garcia
Attorney, Agent, or Firm—Oliff & Berridge, PLC

[57] ABSTRACT

Method and apparatus for processing color images wherein a black ink having a low infiltrate rate and color inks having a high infiltration rate are used for color printing are described. In the method and apparatus, part of black image data is converted into image data for other colors so that part of a portion to be printed with black ink droplets is printed with color ink droplets. Alternatively, part of the portion may be printed with black ink dots and other color dots being superposed. By this, bleeding between black and other color inks can be suppressed with the resultant image being a black density and sharp edge when printed on ordinary paper.

17 Claims, 27 Drawing Sheets

|   | i MOD 4 |   |   |   |
|---|---|---|---|---|
| j MOD 4 | 0 | 1 | 2 | 3 |
| 0 | K | K | K | K |
| 1 | K | K | K | K |
| 2 | K | K | K | K |
| 3 | K | K | K | K |

K: BLACK INK
C: CYAN INK
M: MAGENTA INK
Y: YELLOW INK

|   | i MOD 4 |   |   |   |
|---|---|---|---|---|
| j MOD 4 | 0 | 1 | 2 | 3 |
| 0 | K | C | K | Y |
| 1 | M | K | C | K |
| 2 | K | C | K | M |
| 3 | M | K | Y | K |

K: BLACK INK
C: CYAN INK
M: MAGENTA INK
Y: YELLOW INK

INK COMPOSITION AND PHYSICAL PROPERTIES
AND CHARACTERISTICS THEREOF
(FX-L PAPER USED FOR ABSORPTION CHARACTERISTIC)

| INK COMPOSITION | | BLACK | CYAN | MAGENTA | YELLOW |
|---|---|---|---|---|---|
| INK COMPOSITION | DYE | 2.5 | 3.0 | 3.0 | 3.0 |
| | DEG | 15.0 | 25.0 | 25.0 | 25.0 |
| | BLOCK COPOLYMER | – | 1.0 | 1.0 | 1.0 |
| | ION-EXCHANGED WATER | 82.5 | 71.0 | 71.0 | 71.0 |
| VISCOSITY (mP·s) | | 1.8 | 2.7 | 2.3 | 2.5 |
| SURFACE TENSION (mN/m) | | 47 | 36 | 36 | 36 |
| ABSORPTION COEFFICIENT: Ka (ml/m²lms$^{-1/2}$) | | 0.2 | 3.0 | 2.8 | 2.8 |
| WETTING TIME: Tw (ms) | | 140 | 10 | 8 | 8 |

BLOCK COPOLYMER: COPOLYMER OF PROPYLENE OXIDE AND ETHYLENE OXIDE WITH AN AVERAGE MOLECULAR WEIGHT OF 1,700 AND A CONTENT OF ETHYLENE OXIDE OF 30%

FIG.4
RELATED ART

| CHARACTERISTIC PROPERTIES | STANDARDS |
|---|---|
| THICKNESS (mm/1000) | 85±3 |
| BASIS WEIGHT (g/m$^2$) | 64+3.0−1.0 |
| SMOOTHNESS Fs (sec) | MIN. 30 |
| SMOOTHNESS Ws (sec) | MIN. 25 |
| GAS TRANSMISSION (sec) | MIN. 10 |
| MOISTURE CONTENT WHEN OPENED (%) | 4.0~5.4 |
| WHITENESS (%) | 80.5±2.5 |
| ASH CONTENT (%) | 5 |

FIG.5
RELATED ART

|   | 0 | 1 | 2 | 3 |
|---|---|---|---|---|
| 0 | 1 | 0 | 1 | 0 |
| 1 | 0 | 1 | 0 | 1 |
| 2 | 1 | 0 | 1 | 0 |
| 3 | 0 | 1 | 0 | 1 |

FIG.6A

|   | 0 | 1 | 2 | 3 |
|---|---|---|---|---|
| 0 | 0 | 1 | 0 | 0 |
| 1 | 0 | 0 | 1 | 0 |
| 2 | 0 | 1 | 0 | 0 |
| 3 | 0 | 0 | 0 | 0 |

FIG.6B

|   | 0 | 1 | 2 | 3 |
|---|---|---|---|---|
| 0 | 0 | 0 | 0 | 0 |
| 1 | 1 | 0 | 0 | 0 |
| 2 | 0 | 0 | 0 | 1 |
| 3 | 1 | 0 | 0 | 0 |

FIG.6C

|   | 0 | 1 | 2 | 3 |
|---|---|---|---|---|
| 0 | 0 | 0 | 0 | 1 |
| 1 | 0 | 0 | 0 | 0 |
| 2 | 0 | 0 | 0 | 0 |
| 3 | 0 | 0 | 1 | 0 |

FIG.6D

| C | C | C | C | C | C | K | K |
|---|---|---|---|---|---|---|---|
| C | C | C | C | C | K | K | K |
| C | C | C | C | K | K | K | M |
| C | C | C | K | K | K | M | M |
| C | C | K | K | K | M | M | M |
| C | K | K | K | M | M | M | M |
| K | K | K | K | K | K | K | K |
| K | K | K | K | K | K | K | K |

FIG.8A

| 0 | 0 | 0 | 0 | 0 | 0 | 1 | 1 |
|---|---|---|---|---|---|---|---|
| 0 | 0 | 0 | 0 | 0 | 1 | 1 | 1 |
| 0 | 0 | 0 | 0 | 1 | 1 | 1 | 0 |
| 0 | 0 | 0 | 1 | 1 | 1 | 0 | 0 |
| 0 | 0 | 1 | 1 | 1 | 0 | 0 | 0 |
| 0 | 1 | 1 | 1 | 0 | 0 | 0 | 0 |
| 1 | 1 | 1 | 1 | 1 | 1 | 1 | 1 |
| 1 | 1 | 1 | 1 | 1 | 1 | 1 | 1 |

FIG.8B

| 1 | 1 | 1 | 1 | 1 | 1 | 0 | 0 |
|---|---|---|---|---|---|---|---|
| 1 | 1 | 1 | 1 | 1 | 0 | 0 | 0 |
| 1 | 1 | 1 | 1 | 0 | 0 | 0 | 0 |
| 1 | 1 | 1 | 0 | 0 | 0 | 0 | 0 |
| 1 | 1 | 0 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG.8C

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 1 |
| 0 | 0 | 0 | 0 | 0 | 0 | 1 | 1 |
| 0 | 0 | 0 | 0 | 0 | 1 | 1 | 1 |
| 0 | 0 | 0 | 0 | 1 | 1 | 1 | 1 |
| 0 | 0 | 0 | 0 | 0 | 0 | 0 | 0 |
| 0 | 0 | 0 | 0 | 0 | 0 | 0 | 0 |

| 0 | 0 | 0 | 0 | 0 | 0 | 1 | 1 |
|---|---|---|---|---|---|---|---|
| 0 | 0 | 0 | 0 | 0 | 1 | 1 | 1 |
| 0 | 0 | 0 | 0 | 1 | 1 | 1 | 0 |
| 0 | 0 | 0 | 1 | 1 | 1 | 0 | 0 |
| 0 | 0 | 1 | 1 | 1 | 0 | 0 | 0 |
| 0 | 1 | 1 | 1 | 0 | 0 | 0 | 0 |
| 1 | 1 | 1 | 1 | 1 | 1 | 1 | 1 |
| 1 | 1 | 1 | 1 | 1 | 1 | 1 | 1 |

FIG.9B

| 0 | 1 | 0 | 0 |
|---|---|---|---|
| 0 | 0 | 1 | 0 |
| 0 | 1 | 0 | 0 |
| 0 | 0 | 0 | 0 |

FIG.9C

| 0 | 0 | 0 | 0 | 0 | 0 | 0 | 0 |
|---|---|---|---|---|---|---|---|
| 0 | 0 | 0 | 0 | 0 | 0 | 1 | 0 |
| 0 | 0 | 0 | 0 | 0 | 1 | 0 | 0 |
| 0 | 0 | 0 | 0 | 0 | 0 | 0 | 0 |
| 0 | 0 | 0 | 0 | 0 | 0 | 0 | 0 |
| 0 | 0 | 1 | 0 | 0 | 0 | 0 | 0 |
| 0 | 1 | 0 | 0 | 0 | 1 | 0 | 0 |
| 0 | 0 | 0 | 0 | 0 | 0 | 0 | 0 |

FIG.9D

| 1 | 1 | 1 | 1 | 1 | 1 | 0 | 0 |
|---|---|---|---|---|---|---|---|
| 1 | 1 | 1 | 1 | 1 | 0 | 0 | 0 |
| 1 | 1 | 1 | 1 | 0 | 0 | 0 | 0 |
| 1 | 1 | 1 | 0 | 0 | 0 | 0 | 0 |
| 1 | 1 | 0 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG.9E

| 1 | 1 | 1 | 1 | 1 | 1 | 0 | 0 |
|---|---|---|---|---|---|---|---|
| 1 | 1 | 1 | 1 | 1 | 0 | 1 | 0 |
| 1 | 1 | 1 | 1 | 0 | 1 | 0 | 0 |
| 1 | 1 | 1 | 0 | 0 | 0 | 0 | 0 |
| 1 | 1 | 0 | 0 | 0 | 0 | 0 | 0 |
| 1 | 0 | 1 | 0 | 0 | 0 | 0 | 0 |
| 0 | 1 | 0 | 0 | 0 | 1 | 0 | 0 |
| 0 | 0 | 0 | 0 | 0 | 0 | 0 | 0 |

| 0 | 0 | 0 | 0 | 0 | 0 | 1 | 1 |
|---|---|---|---|---|---|---|---|
| 0 | 0 | 0 | 0 | 0 | 1 | 1 | 1 |
| 0 | 0 | 0 | 0 | 1 | 1 | 1 | 0 |
| 0 | 0 | 0 | 1 | 1 | 1 | 0 | 0 |
| 0 | 0 | 1 | 1 | 1 | 0 | 0 | 0 |
| 0 | 1 | 1 | 1 | 0 | 0 | 0 | 0 |
| 1 | 1 | 1 | 1 | 1 | 1 | 1 | 1 |
| 1 | 1 | 1 | 1 | 1 | 1 | 1 | 1 |

FIG.11B

| 0 | 0 | 0 | 1 |
|---|---|---|---|
| 0 | 0 | 0 | 0 |
| 0 | 0 | 0 | 0 |
| 0 | 0 | 1 | 0 |

FIG.11C

| 0 | 0 | 0 | 0 | 0 | 0 | 0 | 1 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 1 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 1 | 0 | 0 | 0 | 1 | 0 |

FIG.11D

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG.11E

| 0 | 0 | 0 | 0 | 0 | 0 | 0 | 1 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 1 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 1 | 0 | 0 | 0 | 1 | 0 |

|   |   |   |   |   |   |   |   |
|---|---|---|---|---|---|---|---|
| 0 | 0 | 0 | 0 | 0 | 0 | 1 | 1 |
| 0 | 0 | 0 | 0 | 0 | 1 | 1 | 1 |
| 0 | 0 | 0 | 0 | 1 | 1 | 1 | 0 |
| 0 | 0 | 0 | 1 | 1 | 1 | 0 | 0 |
| 0 | 0 | 1 | 1 | 1 | 0 | 0 | 0 |
| 0 | 1 | 1 | 1 | 0 | 0 | 0 | 0 |
| 1 | 1 | 1 | 1 | 1 | 1 | 1 | 1 |
| 1 | 1 | 1 | 1 | 1 | 1 | 1 | 1 |

FIG.12A

|   |   |   |   |
|---|---|---|---|
| 1 | 0 | 1 | 0 |
| 0 | 1 | 0 | 1 |
| 1 | 0 | 1 | 0 |
| 0 | 1 | 0 | 1 |

FIG.12B

|   |   |   |   |   |   |   |   |
|---|---|---|---|---|---|---|---|
| 0 | 0 | 0 | 0 | 0 | 0 | 1 | 0 |
| 0 | 0 | 0 | 0 | 0 | 1 | 0 | 1 |
| 0 | 0 | 0 | 0 | 1 | 0 | 1 | 0 |
| 0 | 0 | 0 | 1 | 0 | 1 | 0 | 0 |
| 0 | 0 | 1 | 0 | 1 | 0 | 0 | 0 |
| 0 | 1 | 0 | 1 | 0 | 0 | 0 | 0 |
| 1 | 0 | 1 | 0 | 1 | 0 | 1 | 0 |
| 0 | 1 | 0 | 1 | 0 | 1 | 0 | 1 |

FIG.12C

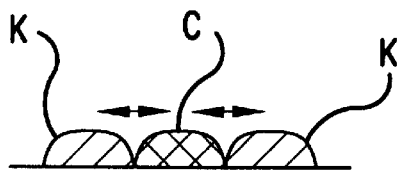
FIG.13A
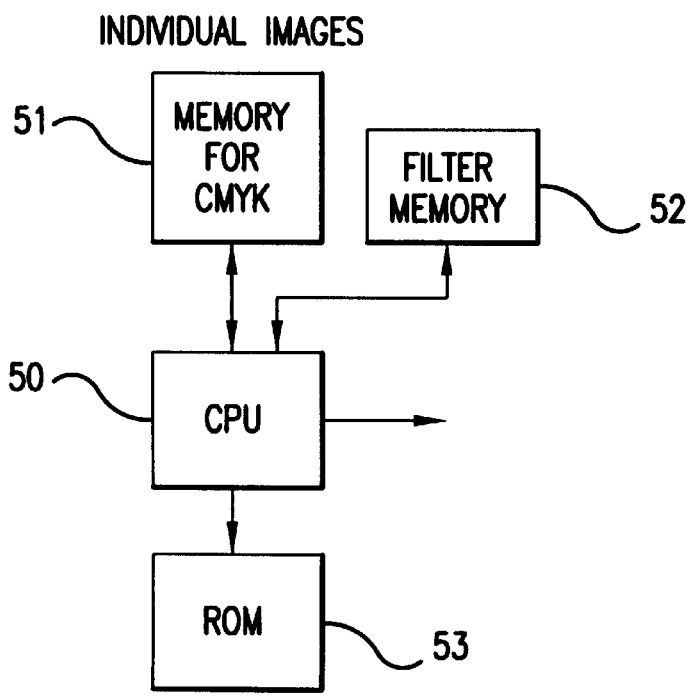
FIG.13B
FIG.14

8 PIXEL UNIT

| 1 | 0 | 0 | 0 | 0 | 0 | 1 | 0 |

$fk(i)(0) = 0 \times aa$
$fk(i)(1) = 0 \times 55$
$fk(i)(2) = 0 \times aa$
$fk(i)(3) = 0 \times 55$ $fc(i)(0) = 0 \times 44$
$fc(i)(1) = 0 \times 22$
$fc(i)(2) = 0 \times 44$
$fc(i)(3) = 0 \times 00$

FIG.16

|   | 0 | 1 | 2 | 3 |
|---|---|---|---|---|
| 0 | 1 | 0 | 1 | 0 |
| 1 | 0 | 1 | 0 | 1 |
| 2 | 1 | 0 | 1 | 0 |
| 3 | 0 | 1 | 0 | 1 |

FIG.19A

|   | 0 | 1 | 2 | 3 |
|---|---|---|---|---|
| 0 | 0 | 0 | 0 | 1 |
| 1 | 0 | 1 | 0 | 0 |
| 2 | 0 | 0 | 0 | 0 |
| 3 | 0 | 1 | 1 | 0 |

FIG.19B

|   | 0 | 1 | 2 | 3 |
|---|---|---|---|---|
| 0 | 0 | 1 | 0 | 0 |
| 1 | 0 | 0 | 1 | 0 |
| 2 | 0 | 1 | 0 | 0 |
| 3 | 0 | 0 | 0 | 1 |

FIG.19C

|   | 0 | 1 | 2 | 3 |
|---|---|---|---|---|
| 0 | 0 | 0 | 0 | 0 |
| 1 | 1 | 0 | 0 | 1 |
| 2 | 0 | 0 | 0 | 1 |
| 3 | 1 | 0 | 0 | 0 |

| C | C | C | C | C | C | K | K |
|---|---|---|---|---|---|---|---|
| C | C | C | C | C | K | K | K |
| C | C | C | C | K | K | K | M |
| C | C | C | K | K | K | M | M |
| C | C | K | K | K | M | M | M |
| C | K | K | K | M | M | M | M |
| K | K | K | K | K | K | K | K |
| K | K | K | K | K | K | K | K |

FIG.20B

| 0 | 0 | 0 | 0 | 0 | 0 | 1 | 1 |
|---|---|---|---|---|---|---|---|
| 0 | 0 | 0 | 0 | 0 | 1 | 1 | 1 |
| 0 | 0 | 0 | 0 | 1 | 1 | 1 | 0 |
| 0 | 0 | 0 | 1 | 1 | 1 | 0 | 0 |
| 0 | 0 | 1 | 1 | 1 | 0 | 0 | 0 |
| 0 | 1 | 1 | 1 | 0 | 0 | 0 | 0 |
| 1 | 1 | 1 | 1 | 1 | 1 | 1 | 1 |
| 1 | 1 | 1 | 1 | 1 | 1 | 1 | 1 |

FIG.20C

| 1 | 1 | 1 | 1 | 1 | 1 | 0 | 0 |
|---|---|---|---|---|---|---|---|
| 1 | 1 | 1 | 1 | 1 | 0 | 0 | 0 |
| 1 | 1 | 1 | 1 | 0 | 0 | 0 | 0 |
| 1 | 1 | 1 | 0 | 0 | 0 | 0 | 0 |
| 1 | 1 | 0 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG.20D

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 1 |
| 0 | 0 | 0 | 0 | 0 | 0 | 1 | 1 |
| 0 | 0 | 0 | 0 | 0 | 1 | 1 | 1 |
| 0 | 0 | 0 | 0 | 1 | 1 | 1 | 1 |
| 0 | 0 | 0 | 0 | 0 | 0 | 0 | 0 |
| 0 | 0 | 0 | 0 | 0 | 0 | 0 | 0 |

| 0 | 0 | 0 | 0 | 0 | 0 | 1 | 1 |
|---|---|---|---|---|---|---|---|
| 0 | 0 | 0 | 0 | 0 | 1 | 1 | 1 |
| 0 | 0 | 0 | 0 | 1 | 1 | 1 | 0 |
| 0 | 0 | 0 | 1 | 1 | 1 | 0 | 0 |
| 0 | 0 | 1 | 1 | 1 | 0 | 0 | 0 |
| 0 | 1 | 1 | 1 | 0 | 0 | 0 | 0 |
| 1 | 1 | 1 | 1 | 1 | 1 | 1 | 1 |
| 1 | 1 | 1 | 1 | 1 | 1 | 1 | 1 |

FIG.22B

| 0 | 1 | 0 | 0 |
|---|---|---|---|
| 0 | 0 | 1 | 0 |
| 0 | 1 | 0 | 0 |
| 0 | 0 | 0 | 1 |

FIG.22C

| 0 | 0 | 0 | 0 | 0 | 0 | 0 | 0 |
|---|---|---|---|---|---|---|---|
| 0 | 0 | 0 | 0 | 0 | 0 | 1 | 0 |
| 0 | 0 | 0 | 0 | 0 | 1 | 0 | 0 |
| 0 | 0 | 0 | 0 | 0 | 0 | 0 | 0 |
| 0 | 0 | 0 | 0 | 0 | 0 | 0 | 0 |
| 0 | 0 | 1 | 0 | 0 | 0 | 0 | 0 |
| 0 | 1 | 0 | 0 | 0 | 1 | 0 | 0 |
| 0 | 0 | 0 | 1 | 0 | 0 | 0 | 1 |

FIG.22D

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 1 |
| 0 | 0 | 0 | 0 | 0 | 0 | 1 | 1 |
| 0 | 0 | 0 | 0 | 0 | 1 | 1 | 1 |
| 0 | 0 | 0 | 0 | 1 | 1 | 1 | 1 |
| 0 | 0 | 0 | 0 | 0 | 0 | 0 | 0 |
| 0 | 0 | 0 | 0 | 0 | 0 | 0 | 0 |

FIG.22E

| 0 | 0 | 0 | 0 | 0 | 0 | 0 | 0 |
|---|---|---|---|---|---|---|---|
| 0 | 0 | 0 | 0 | 0 | 0 | 1 | 0 |
| 0 | 0 | 0 | 0 | 0 | 1 | 0 | 1 |
| 0 | 0 | 0 | 0 | 0 | 0 | 1 | 1 |
| 0 | 0 | 0 | 0 | 0 | 1 | 1 | 1 |
| 0 | 0 | 1 | 0 | 1 | 1 | 1 | 1 |
| 0 | 1 | 0 | 0 | 0 | 1 | 0 | 0 |
| 0 | 0 | 0 | 1 | 0 | 0 | 0 | 1 |

FIG.23A

| 0 | 0 | 0 | 0 | 0 | 0 | 1 | 1 |
|---|---|---|---|---|---|---|---|
| 0 | 0 | 0 | 0 | 0 | 1 | 1 | 1 |
| 0 | 0 | 0 | 0 | 1 | 1 | 1 | 0 |
| 0 | 0 | 0 | 1 | 1 | 1 | 0 | 0 |
| 0 | 0 | 1 | 1 | 1 | 0 | 0 | 0 |
| 0 | 1 | 1 | 1 | 0 | 0 | 0 | 0 |
| 1 | 1 | 1 | 1 | 1 | 1 | 1 | 1 |
| 1 | 1 | 1 | 1 | 1 | 1 | 1 | 1 |

FIG.23B

| 0 | 0 | 0 | 1 |
|---|---|---|---|
| 0 | 1 | 0 | 0 |
| 0 | 0 | 0 | 0 |
| 0 | 1 | 1 | 0 |

FIG.23C

| 0 | 0 | 0 | 0 | 0 | 0 | 0 | 1 |
|---|---|---|---|---|---|---|---|
| 0 | 0 | 0 | 0 | 0 | 1 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 1 | 0 | 0 | 0 | 0 |
| 0 | 1 | 0 | 0 | 0 | 0 | 0 | 0 |
| 0 | 0 | 0 | 0 | 0 | 0 | 0 | 0 |
| 0 | 1 | 1 | 0 | 0 | 1 | 1 | 0 |

FIG.23D

| 1 | 1 | 1 | 1 | 1 | 1 | 0 | 0 |
|---|---|---|---|---|---|---|---|
| 1 | 1 | 1 | 1 | 1 | 0 | 0 | 0 |
| 1 | 1 | 1 | 1 | 0 | 0 | 0 | 0 |
| 1 | 1 | 1 | 0 | 0 | 0 | 0 | 0 |
| 1 | 1 | 0 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG.23E

| 1 | 1 | 1 | 1 | 1 | 1 | 0 | 1 |
|---|---|---|---|---|---|---|---|
| 1 | 1 | 1 | 1 | 1 | 1 | 0 | 0 |
| 1 | 1 | 1 | 1 | 0 | 0 | 0 | 0 |
| 1 | 1 | 1 | 0 | 0 | 0 | 0 | 0 |
| 1 | 1 | 0 | 1 | 0 | 0 | 0 | 0 |
| 1 | 1 | 0 | 0 | 0 | 0 | 0 | 0 |
| 0 | 0 | 0 | 0 | 0 | 0 | 0 | 0 |
| 0 | 1 | 1 | 0 | 0 | 1 | 1 | 0 |

FIG.24A

| 0 | 0 | 0 | 0 | 0 | 0 | 1 | 1 |
|---|---|---|---|---|---|---|---|
| 0 | 0 | 0 | 0 | 0 | 1 | 1 | 1 |
| 0 | 0 | 0 | 0 | 1 | 1 | 1 | 0 |
| 0 | 0 | 0 | 1 | 1 | 1 | 0 | 0 |
| 0 | 0 | 1 | 1 | 1 | 0 | 0 | 0 |
| 0 | 1 | 1 | 1 | 0 | 0 | 0 | 0 |
| 1 | 1 | 1 | 1 | 1 | 1 | 1 | 1 |
| 1 | 1 | 1 | 1 | 1 | 1 | 1 | 1 |

FIG.24B

| 1 | 0 | 1 | 0 |
|---|---|---|---|
| 0 | 1 | 0 | 1 |
| 1 | 0 | 1 | 0 |
| 0 | 1 | 0 | 1 |

FIG.24C

| 0 | 0 | 0 | 0 | 0 | 0 | 1 | 0 |
|---|---|---|---|---|---|---|---|
| 0 | 0 | 0 | 0 | 0 | 1 | 0 | 1 |
| 0 | 0 | 0 | 0 | 1 | 0 | 1 | 0 |
| 0 | 0 | 0 | 1 | 0 | 1 | 0 | 0 |
| 0 | 0 | 1 | 0 | 1 | 0 | 0 | 0 |
| 0 | 1 | 0 | 1 | 0 | 0 | 0 | 0 |
| 1 | 0 | 1 | 0 | 1 | 0 | 1 | 0 |
| 0 | 1 | 0 | 1 | 0 | 1 | 0 | 1 |

METHOD AND APPARATUS FOR PROCESSING COLOR IMAGES

This is a continuation of application Ser. No. 08/314,686 filed Sep. 29, 1994, now abandoned.

BACKGROUND OF THE INVENTION

1. Field of The Invention

This invention relates to method and apparatus for processing color images which are adapted for use in ink jet printers for printing color images. More particularly, the invention relates to method and apparatus for processing color images whereby images of good quality can be printed, without any bleeding, on ordinary paper sheets, such as paper sheets for xerography, ordinarily used in electrophotographic copying machines.

2. Description of the Related Art

As is known in the art, ink jet printing methods comprise discharging and flying ink droplets from a nozzle of a discharge energy generator, such as an piezoelectric device or an electrothermal conversion device, used as a discharge drive source, and permitting, as shown in FIG. 26, ink droplets 101 to be deposited on and absorbed in a material 100 to be printed, such as a printing paper sheet, film or cloth, thereby printing images on the material 100. These methods are advantageous in that they can be performed at low noises without use of any specific fixing treatment and that not only black-and-white images, but also full color images can be printed.

In order to carry out full color image printing using the ink jet printing method, it is usual to employ printing sheets for ink jet printing, which have a coating layer applied onto a base sheet and made of a dispersion of fine particles of $SiO_2$ or CaO in a hydrophilic resin, in order to permit good absorption and fixing of an ink in a material to be printed and to obtain images of high quality. This eventually leads to a high so-called running cost which is a cost for obtaining one print.

On the other hand, in the ink jet printing method, when if full color images are printed on materials having no good ink absorptivity, such as sheets for xerography or wood-free paper sheets usually employed in electrophotographic copying machines, not on printing sheets adapted for use in ink jet printing, the following problems will arise. For full color image printing, where paper sheets for xerography or wood-free paper which is not good at ink absorptivity is used, as a material to be printed, in combination with an ink of the type which can yield letter or line images of relatively good quality and which is not high in drying speed, ink droplets 101 on a material 100 to be printed do not dry immediately as is shown in FIGS. 27a and 27b. In the case, the ink droplets 101 run and spread to an extent that adjacent printed ink droplets are associated with one another. As a consequence, so-called color bleeding takes place between adjacent ink droplets having different colors, thus presenting the problem that the colors are undesirably mingled, resulting in the degradation of image quality.

On the contrary, where paper sheets for xerography or wood-free paper which is not good at ink absorptivity is used, as a material to be printed, in combination with an ink of the type which is relatively high in drying and infiltration rates, it will be possible to suppress the bleeding between the color inks in full color images. However, as shown in FIGS. 28a and 28b, ink droplets 101 readily, deeply infiltrate into the material to be printed without leaving the color stuffs on the surface of the sheet. The printed region of the ink droplets 101 is low in concentration with a narrow color reproduction range. In addition, the ink is dried as spreading horizontally relative to the surface of the material to be printed, with the attendant problem that letter and/or line images become relatively thick with and the image quality becomes degraded owing to the feathering.

As will be apparent from the above, in the prior art ink jet printing method, if there is used a material to be printed having a slow ink absorption other than printing paper only for ink jet printing, it has been very difficult to attain a high quality of both full color images and letter and/or line images. To avoid this, printing paper only for ink jet printing has to be used as a material to be printed, resulting in a high running cost, i.e. a cost for obtaining one print. This is one of obstacles which have to be overcome for permitting wide use of ink jet printing devices.

In order to overcome the above difficulty, a number of usable techniques have been already proposed.

For instance, with an ink jet printer disclosed in Japanese Patent Laid-open No. 4-355157 wherein plural, different color inks are used for color image printing, the inks have different ink compositions so that at least one ink has an infiltration into a printing medium different from an infiltration of the other inks.

Japanese Patent Laid-open No. 4-364961 discloses an ink jet printer wherein different color inks from a plurality of printing means are used for color image printing, the ink compositions are so arranged that at least one ink has a fixing property different from that of the other inks. The ink jet printer proposed in this application includes such an arrangement that an ink to be precedently printed has a fixing rate higher than an ink which is subsequently printed.

In the above ink jet printing, preference is made to the quality of color images and the quick-drying property of the color inks is enhanced thereby preventing the occurrence of a so-called color bleeding, i.e. a bleeding between colors to ensure good-quality color images being printed. In view of this, attempts have been made to increase the infiltrating power of the inks by adding, to the inks, surface active agents as set out in Japanese Patent Publication No. 62-11781 and block copolymers of propylene oxide and ethylene oxide proposed by us (Japanese Patent Laid-open No. 4-325574).

Thus, where quick-drying inks are used for all colors, the respective inks are mostly infiltrated toward the direction of depth of the sheet as shown in FIG. 28b. This results in the lowering of a print density on the surface of the sheet and also in the degradation in quality of letter and/or line images printed in black ink. In color ink jet printers wherein cyan, magenta and yellow color inks are used in combination with a black ink, it is especially necessary to print letters of a high print density, under which usual practice is that only a black ink used has a low infiltration rate.

However, the prior art techniques have the following problems. Such a difference between the infiltration properties as set forth in the ink jet printer of Japanese Patent Laid-open No. 4-355157 undesirably places a limitation with respect to the reconciliation between color images which are free of any bleeding between different color image regions and sharp images.

On the other hand, with the case of the ink jet printer disclosed in Japanese Patent Laid-open No. 4-364961 wherein at least one ink is prepared as having a fixing property to a printing medium different from that of the other inks and wherein an ink which is precedently printed has a fixing rate higher than an ink to be subsequently printed, the infiltration speed of the subsequently printed ink whose fixing rate is slower greatly differs in between the printed portion and a print-free portion. The ink subsequently printed is drawn non-uniformly toward the printed portion, thereby causing the color bleeding. This has been experimentally confirmed by us.

In the known ink jet prints, where there are used color inks which have, respectively, a high infiltration rate and a black ink whose infiltration rate is low, the following problem arises. When an image region of the color ink having a high infiltration rate and an image region of the black ink having a low infiltration rate are contacted with each other on ordinary paper, the black ink with a low infiltration rate diffuses toward the color ink region as shown in FIGS. 27a and 27b, thereby causing color mingling or bleeding between the black ink and the color ink to lower the image quality.

SUMMARY OF THE INVENTION

It is an object of the invention to provide method and apparatus for processing color images which overcome the problems involved in the prior art.

It is another object of the invention to provide method and apparatus for processing color images which ensure formation, on ordinary paper, of both black color images with a high black color density and sharp edges and images which are substantially free of color mingling or bleeding between the black color and other colors.

According to one embodiment of the invention, there is provided a method for processing a color image by use of a black ink having a first rate of infiltration into paper and other color inks having a second rate of infiltration into the paper wherein the first rate is lower than the second rate, the improvement characterized in that part of black image data is converted to color image data so that part of a portion on which black ink droplets are to be printed is printed with color ink droplets according to the converted color image data.

The method can be carried out by an apparatus according to another embodiment of the invention wherein color images can be printed using a black ink having a first rate of infiltration into paper and other color inks having a second rate of infiltration into the paper which is higher than the first rate, the improvement characterized by comprising an image data conversion means wherein part of black color image data is converted to color image data so that part of a portion on which black ink droplets are to be printed is replaced by color ink droplets according to the converted color image data.

According to a further embodiment of the invention, there is also provided a method for processing a color image by use of a black ink having a first rate of infiltration into paper and other color inks having a second rate of infiltration into the paper wherein the first rate is lower than the second rate, the improvement characterized in that part of black image data is so converted as to serve also as color image data so that part of a portion on which black ink droplets are to be printed is printed with both the black ink droplets and color ink droplets being superposed one on another according to the converted image data.

This method can be carried out by an apparatus according to a still further embodiment of the invention wherein color images can be printed using a black ink having a first rate of infiltration into paper and other color inks having a second rate of infiltration into the paper which is higher than the first rate, the improvement characterized by comprising an image data conversion means wherein part of black color image data is so converted as to serve also as color image data so that part of a portion on which black ink droplets are to be printed is printed with both the black ink droplets and color ink droplets being superposed one on another according to the converted color image data.

As defined hereinabove, according to the color ink jet printing method of the invention, part of black image data is converted to color image data so that part of a portion on which black ink droplets are to be printed is printed with color ink droplets according to the converted image data. By this, the black ink droplets having a lower rate of infiltration and the color ink droplets having a higher rate of infiltration which exist in adjacent pixels are mutually diffused and mingled. In view of the entirety of one pixel, a high degree of ink infiltration is attained. Eventually, it is avoided that when pixel regions consisting of a highly infiltrating ink or inks alone are contiguous to one another, the inks in the pixel regions undergo diffusion and color mingling (bleeding). In this connection, when highly infiltrating ink dots are printed about less infiltrating ink dots, two types of inks can be mixed instantaneously.

In addition, in order to satisfactorily keep the black image quality within a tolerable range, part of the portion on which black ink droplets are to be printed is printed with less infiltrating black ink droplets and highly infiltrating color ink droplets which are superposed in this or reverse order. By this, black images as a whole can be printed more clearly.

According to the second and fourth embodiments of the invention set out hereinbefore, there can be provided image processing apparatus wherein image data can be converted in a manner as set out above.

It will be noted here that the term "infiltration rate" or "degree of infiltration" of ink means one which is expressed in terms of absorption coefficient (Ka) and ink wetting time (Tw), which are, respectively, determined by means of the Bristow tester according to the paper and pulp tentative method No. 51–87 of Japan Tappi. The measurement is effected in a manner as schematically shown in FIG. 29 wherein a given amount of an ink is placed in a head box and the ink is transferred to a paper sheet attached to the peripheral surface of a rotatable cylinder to determined an amount of the transferred ink. By changing the rotary speed, the amount of the transferred ink can be measured within a contact time of from 0.004 to 2 seconds. The relationship between the contact time and the amount of the transferred ink is typically shown in FIG. 30. In the figure, the contact time is expressed in terms of a square root of time. The gradient of the line is an absorption coefficient (Ka) and the amount of the transferred ink at a contact time of 0 second is called a roughness coefficient (Vr), representing the amount of an ink placed in the surface irregularities of a paper sheet. At an initial stage of the contact, there is a time (Tw) at which no ink absorption takes place. This portion of time is called an ink wetting time, which is one required to wet the paper with an ink.

The absorption coefficient is coincident with a coefficient in the following Rucas-Washborn equation wherein an absorption time (t) is taken as a parameter.

$$V = (\epsilon/\tau)\{(r\cos\theta) \cdot t/2\}$$

wherein V=an amount of an absorbed ink per unit time,
$\epsilon$=a void volume,
$\tau$=a flexing rate of capillary tubes in paper surfaces,
$\cos\theta$=a contact angle between the paper and the ink, γ=a surface tension of ink, t=an absorption time of ink, and η=an ink viscosity.

More particularly, the ink absorption coefficient (Ka) is determined depending on the surface condition of paper, the physical properties of ink and the wettability between the ink and the paper.

The ink absorption coefficient (Ka) increases when a paper sheet which is a medium to be printed is changed in conditions, e.g. it undergoes changes in the shrinking rate of fibers, void volume and size, and the like, by application of heat or by irradiation of an electromagnetic wave. In addition, the ink absorption coefficient will increase when the ink attached to paper is instantaneously increased in temperature to decrease the viscosity, of ink. On the other hand, the ink wetting time (Tw) is influenced by the wettability of ink, i.e. the contact angle between the paper and ink and the surface tension of the ink. This ink wetting time (Tw) is predominantly determined depending on the types of ink and paper.

BRIEF DESCRIPTION OF THE DRAWINGS

FIG. 4 is a table showing ink compositions, and physical properties characteristics thereof;

FIG. 5 is a table showing the characteristic properties of a printing sheet FX-L;

FIGS. 6a through 6d are, respectively, an illustrative view showing printing dot positions of individual color inks;

FIGS. 8a through 8d are, respectively, a diagrammatic chart showing printing dot positions of individual color inks;

FIGS. 9a through 9e are, respectively, a diagrammatic chart showing converted printing dot positions of a cyan ink;

FIGS. 10a through 10e are, respectively, a diagrammatic chart showing converted printing dot positions of a magenta ink;

FIGS. 11a through 11e are, respectively, an illustrative view showing converted printing dot positions of a yellow ink;

FIGS. 12a through 12c are, respectively, a diagrammatic chart showing converted printing dot positions of a black ink;

FIGS. 13a and 13b are, respectively, illustrative views showing printed dots of individual color inks and a printed state of the ink dots;

FIG. 14 is a color image processing apparatus according to another embodiment of the invention;

FIG. 16 is an illustrative view showing filter constants used for conversion;

FIGS. 19a through 19d are, respectively, diagrammatic charts showing printing positions of individual color inks;

FIGS. 20a through 20d are, respectively, diagrammatic charts showing printing positions of individual color inks;

FIGS. 21a through 21e are, respectively, diagrammatic charts showing converted printing positions of a cyan ink;

FIGS. 22a through 22e are, respectively, diagrammatic charts showing converted printing positions of a magenta ink;

FIGS. 23a through 23e are, respectively, charts showing converted printing positions of a cyan ink;

FIGS. 24a through 24c are, respectively, diagrammatic charts showing converted printing positions of a cyan ink;

PREFERRED EMBODIMENTS OF THE INVENTION

Figures 1A, 1B, 1C:
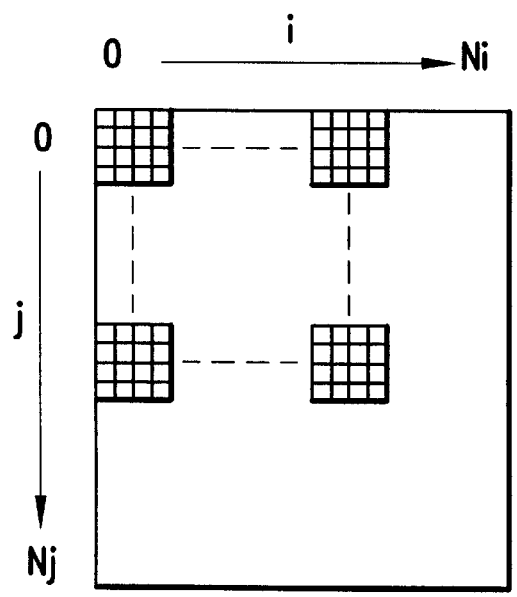
FIGS. 1a, 1b and 1c are, respectively, an illustrative view of a conversion rule in a color image processing method according to one embodiment of the invention.

Embodiments of the invention are described with reference to the accompanying drawings and particularly to FIG. 3 which shows an ink jet printer to which a color image processing method of the invention is applicable.

In the figure, there is shown a printing head 1 which has four printing units 1a, 1b, 1c and 1d corresponding to four colors of black, cyan, magenta and yellow, respectively. These printing units 1a, 1b, 1c and 1d have, respectively, nozzles (not shown) at lower ends as viewed in the figure, from which black, cyan, magenta and yellow inks are discharged according to image information to print an image on a printing sheet 2 used as a medium to be printed. The printing head 1 has ink tanks 3, 4, 5 and 6 which are, respectively, disposed integrally of the printing units 1a, 1b, 1c and 1d at the upper portion thereof and which, respectively, contain black, cyan, magenta and yellow inks. The printing units 1a, 1b, 1c and 1d are, respectively, connected with an electric power supply signal cable 7 with which there are transmitted head drive signals which are obtained by subjecting black, cyan, magenta and yellow color image data to binary coding to develop and product dot patterns.

The printing head 1 is fixed on a head carriage 8. The head carriage 8 is supported with two guide rods 9 as being slidably along a main scanning direction. The head carriage 8 is connected with a timing belt 10 at an end thereof and the timing belt 10 is wound around a drive pulley 12 which is rotatably driven with a drive motor 11. The ink jet printer is so arranged that when the drive motor 11 is driven at predetermined timings to move the head carriage 8 through the timing belt 10 along the main scanning direction thereby printing given color images on a printing sheet 2 by means of the printing head 1 fixed on the head carriage 8. It will be noted that the respective printing units 1a, 1b, 1c and 1d of the printing head 1 are each provided with 256 nozzles being arrayed in the scanning direction of the head carriage 8 and also in a direction normal to the scanning direction at a density of 400 nozzles per inch in a line.

A platen such as of a thin metallic flat sheet (not shown) is arranged as fixed below the printing head 1. The printing sheet 2 is conveyed along the direction of arrow at a given timing by means of paper feed conveyor roller not shown.

The ink tanks 3, 4, 5 and 6 are, respectively, filled with a black ink having a low infiltration rate and with cyan, magenta and yellow inks having a high infiltration rate, from which the black, cyan, magenta and yellow inks are supplied to the printing units 1a, 1b, 1c and 1d of the printing head 1, respectively.

Figure 3:
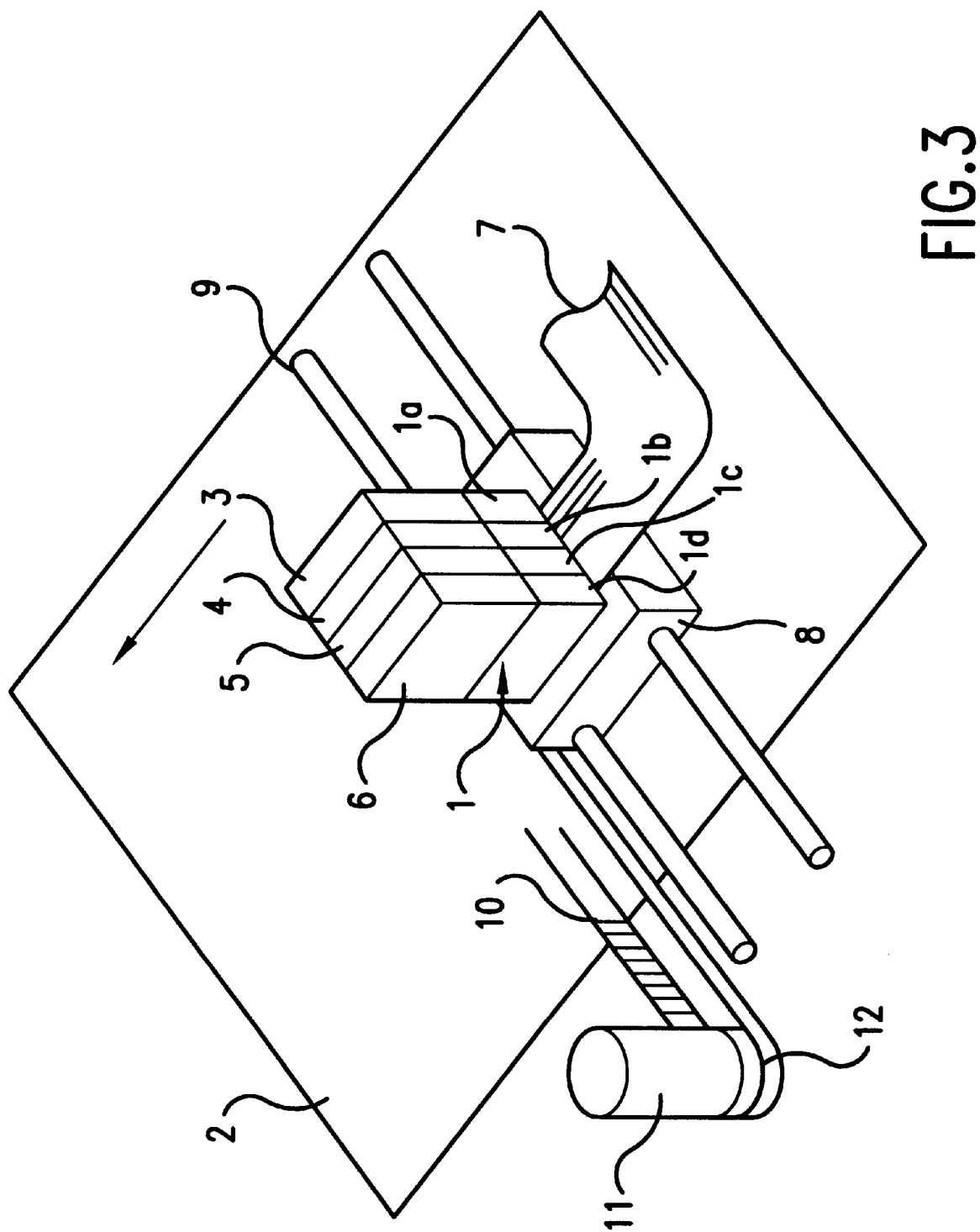
FIG. 3 is a perspective view of an essential part of an ink jet printer to which a color image processing method of the invention is applicable.

In the above ink jet printer, while scanning the printing head 1 fixed on the head carriage 8 by moving the head carriage 8 by means of the drive motor 11 from the left toward the right as viewed in FIG. 3, the inks are discharged from the printing head 1 to print an intended image on the sheet 2. At this time, the drive circuit for the printing head is driven according to dot data obtained by developing color image data in the form of a dot pattern. When printing corresponding to one line is completed, the sheet is fed by the one line by means of a conveyor roller for paper feed (not shown). During this, the printing head 1 is returned to the left side as viewed in FIG. 3 and commences a next cycle of printing.

In this embodiment, the unit pixel which the respective printing units 1a, 1b, 1c and 1d of the printing head 1 are able to print is so arranged as to be a dot matrix composed of lower infiltration rate ink dots and higher infiltration ink dots. The term "lower infiltration rate ink dot or dots" used herein means, for example, one made of a black ink and the term "higher infiltration rate ink dot or dots" means one made of color inks such as cyan, magenta and/or yellow inks. The lower infiltration rate ink should preferably have an absorption coefficient (Ka) not higher than 0.5 ml/m$^2$.ms$^{1/2}$ and a wetting time (Tw) of 50 to 200 milliseconds. On the other hand, the higher infiltration rate ink should preferably have an absorption coefficient (Ka) not higher than 1.0 ml/m$^2$.ms$^{1/2}$ and a wetting time (Tw) not higher than 20 milliseconds.

Such inks are those which have compositions and characteristic properties summarized in Table of FIG. 4. The printing sheet 2 on which images are printed by use of these inks is, for example, L paper commercially available from Fuji Xerox Co., Ltd. which is an ordinary copying paper having characteristics shown in Table of FIG. 5.

Figure 2B:
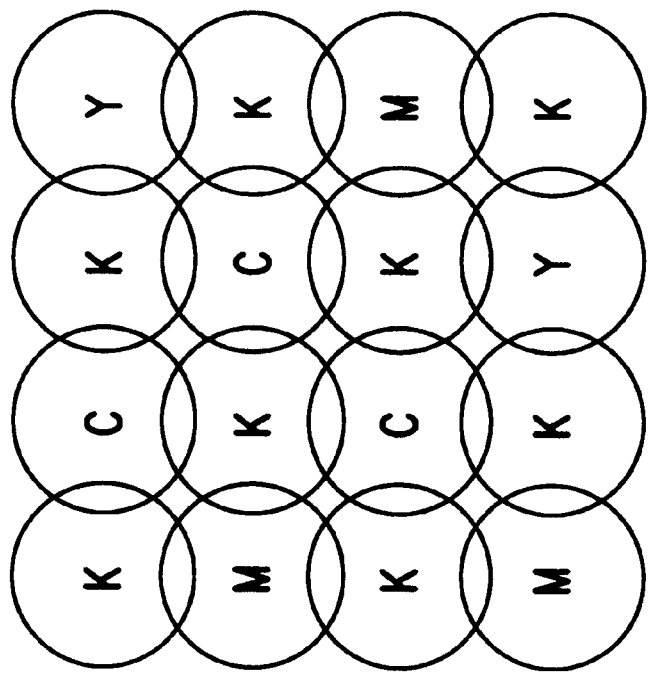
FIGS. 2a and 2b are, respectively, illustrative views showing print patterns of ink dots prior to and after image processing through dot conversion.
Figure 2A:
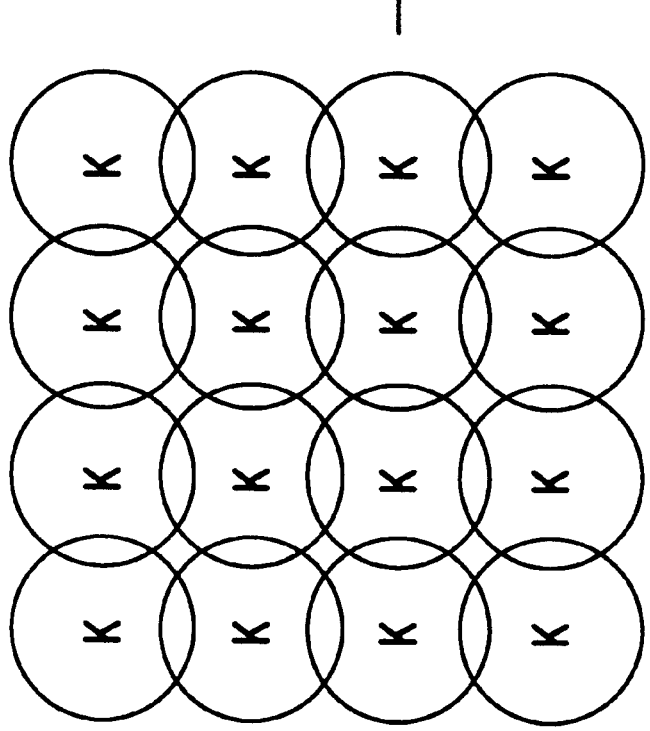

In this embodiment, part of a portion to be printed with black ink droplets should be printed with color ink droplets. To this end, when a black solid print with a size of four pixels in both longitudinal and transverse directions is converted according to a conversion rule shown in FIGS. 1a, to 1c, an input image of FIG. 2a is actually printed as shown in FIG. 2b. In the case, 4×4 filters as shown in FIGS. 6a to 6d are used. It will be noted here that the conversion rule shown in FIGS. 1a, to 1c is to convert part of black image data into cyan, magenta or yellow image data so that part of a portion to be printed with black ink droplets is printed with cyan, magenta or yellow ink droplets. In the conversion rule, where the matrix of 4×4=16 is printed according a predetermined order using a known area tone method, first to eighth dots to be printed are printed with a black ink and ninth to sixteenth dots to be printed are replaced by dots of cyan, magenta and yellow inks in this order. However, the rule is not limited to the above order, but ninth and subsequent dots may be replaced by three cyan dots, three magenta dots and two yellow dots, or may be replaced by combinations with other color dots or by dots of one color ink other than the black ink.

Figure 7:
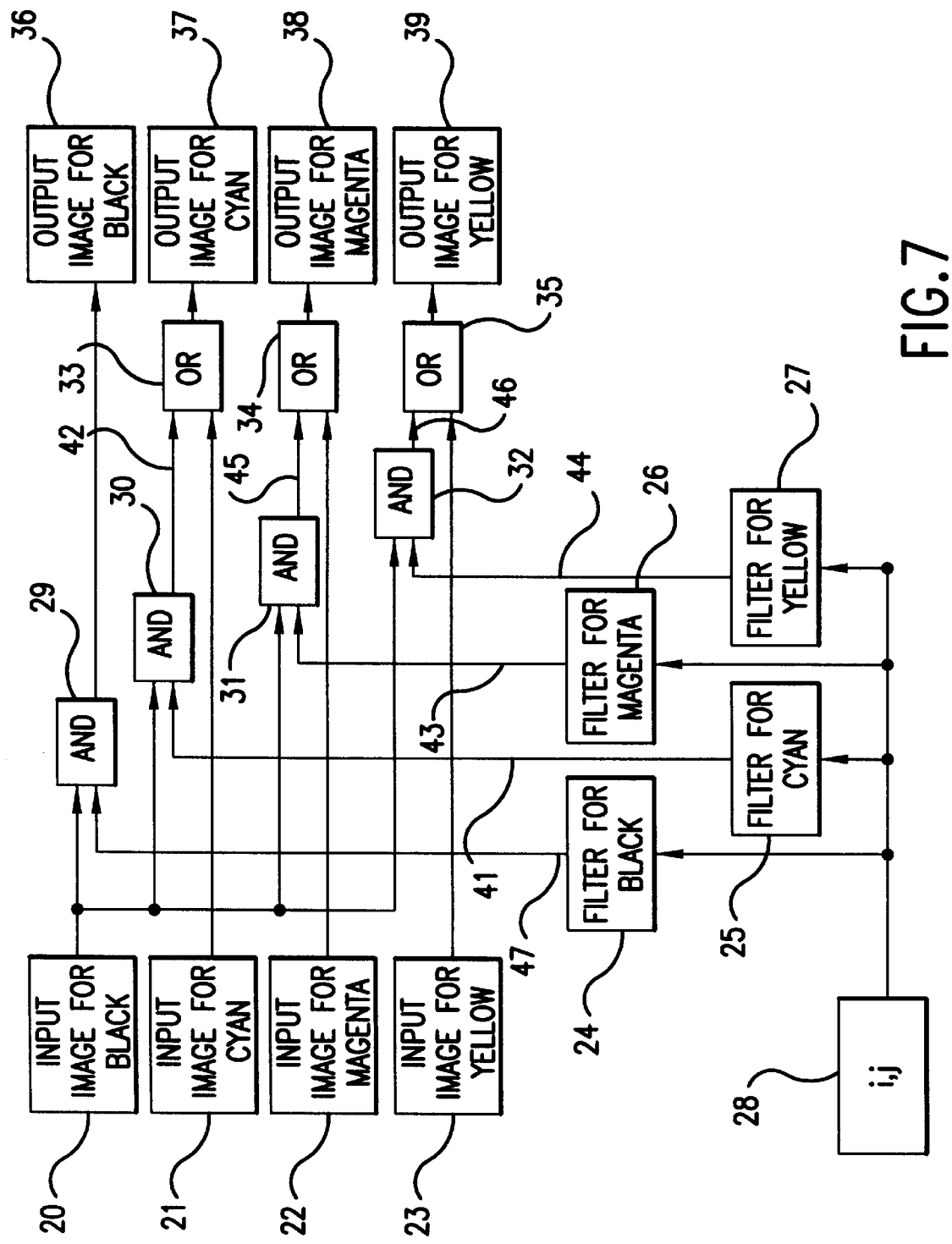
FIG. 7 is a block diagram showing an embodiment of a color image processing apparatus according to the invention.

FIG. 7 shows a block diagram showing a color image processing apparatus for carrying out the color image processing method set out hereinabove.

In the figure, reference numeral 20 indicates black color input image data inputted in terms of binary codes of 0 and 1. Indicated by reference number 21 are cyan color input image data inputted as binary codes of 0 and 1, by 22 are magenta color input image data inputted as binary codes of 0 and 1, and by 23 are yellow color input image data inputted as binary codes of 0 and 1.

Reference numeral 24 indicates a filter for black color image which has preliminarily memorized black dots replaced by other colors among dots (i, j) in individual dot matrices of 4×4 when an input image has been divided into dot matrices of 4×4. Reference numeral 25 indicates a filter for cyan image which has preliminarily memorized black dots, which are to be replaced by cyan dots, among dots (i, j) in individual dot matrices of 4×4 when an input image is divided into dot matrices of 4×4. Likewise, reference numeral 26 indicates a filter for magenta image which has preliminarily memorized black dots, which are to be replaced by magenta dots, among dots (i, j) in individual dot matrices of 4×4 when an input image is divided into dot matrices of 4×4. Reference numeral 27 indicates a filter for yellow image which has preliminarily memorized black dots, which are to be replaced by yellow dots, among dots (i, j) in individual dot matrices of 4×4 when an input image is divided into dot matrices of 4×4. These color filters 24 to 27 are each composed, for example, of ROM in which intended data have been preliminarily memorized.

Reference numeral 28 indicates a parameter indicating dot positions (i, j) of the respective input image data corresponding to one page of black, cyan, magenta and yellow colors wherein i indicates a dot position of an image in a row and j indicates a dot position of an image in a column. The parameter 28 indicating the dot positions (i, j) of the input image data is expressed in terms of a binary numeral in view of the fact that the entirety of the input image data is divided into dot matrices of 4×4. The dot position (i, j) of the input image data expressed by the binary numeral is a reminder obtained after division of the dot position of an actual input image data by 4. As a consequence, the dot position (i, j) of the input image data used as the parameter 28 is, as set forth above, a reminder obtained by dividing the dot position (i, j) of an actual input image data, so that there is used only a two bit value at the subordinate position of the dot position (i, j) of the input image data expressed by the binary numeral. For instance, assuming that the dot position (i, j) of an actual input image data is (5,5), the dot position of the input image data expressed by the binary numeral is (0000101, 0000101) and the value of the two bits (01, 01) at the subordinate position alone is used as the actual parameter 28.

Reference numeral 29 indicates an AND circuit for taking a logical product between the black color input image data 20 and the output data of the filter 24 for black color, reference numeral 30 indicates an AND circuit for taking a logical product between the input image data 20 of black color and the output data of the filter 25 for cyan color, and reference numeral 31 indicates an AND circuit for taking a logical product between the input image data 20 for black color and the output data of the filter 26 for magenta color. Reference numeral 32 indicates an AND circuit for taking a logical product between the input image data 20 for black color and the output data of the filter 27 for yellow color. Reference numeral 33 indicates an OR circuit for taking a logical summation of the AND circuit 30 and the input image data 21 of cyan color, reference numeral 34 indicates an OR circuit for taking a logical summation of the AND circuit 31 and the input image data 22 of magenta color, and reference numeral 35 indicates an OR circuit for taking a logical summation of the AND circuit 32 and the input image data 23 of yellow color.

Moreover, reference numeral 36 indicates output image data for black from the AND circuit 29, reference numeral 37 indicates input image data for cyan from the OR circuit 33, reference numeral 38 indicates output image data for magenta from the OR circuit 34, and reference numeral 39 indicates output image data for yellow from the OR circuit 35. These output image data 36 to 39 for the black, cyan, magenta and yellow are, respectively, applied to corresponding color printing units 1a, 1b, 1c and 1d of the printing head 1 at given timings as shown in FIG. 3.

The inputs of the input image data 20 to 23 for the black, cyan, magenta and yellow and the outputs of the output image data 36 to 39 may be performed in every line for image data corresponding to one page or may be performed in every page. In this case, if necessary, it is possible to use a latch circuit or a memory circuit for transiently memorizing the input image data 20 to 23 and output image data 36 to 39 for black, cyan, magenta and yellow.

In this arrangement, the ink jet printer according to this embodiment, color images can be printed in the following manner.

Color print image data of black, cyan, magenta and yellow, i.e. input image data 20 to 23 of black, cyan, magenta and yellow, are fed from an exterior image reader or host computer to the ink jet printer. When print image data are fed from outside to the ink jet printer, the respective input image data 20 to 23 corresponding to the respective colors of black, cyan, magenta and yellow are processed in the color image processing apparatus as shown in FIG. 7.

In this color image processing apparatus, the input image data 20 to 23 corresponding to the black, cyan, magenta and yellow colors are subjected to intended filter processings through the filter circuits 24 to 27 corresponding to the black, cyan, magenta and yellow colors according to the parameter 28 indicating the bit position of (i, j) of the input image data. The logical products or logical summations of the data obtained after the filter processings and the input image data 20 to 23 are produced through the AND circuits and the OR circuits thereby outputting image data 36 to 39 corresponding to the black, cyan, magenta and yellow colors.

The image processing operation of the color image processing apparatus is more particularly described.

Initially, it is assumed that, as shown in FIG. 8a, the input image data 20 to 23 consist of an image 40 which, in turn, consists of 8 pixels×8 pixels. The image 40 includes cyan and magenta pixels which are partitioned with black pixels aligned obliquely and horizontally as shown. The input image data of the color image can be resolved into image data 20 to 22 of black, cyan and magenta, respectively, as shown in FIGS. 8b to 8d. With the image shown in FIG. 8a, there is no yellow color image and all of the input image data 23 corresponding to yellow are "0".

The input image data 20 to 23 of black, cyan and magenta, respectively, shown in FIGS. 8b to 8d, and yellow which is not shown because such data are all "0", are subjected to image processing in the color image processing apparatus.

The cyan input image data 21 in the 8 pixels×8 pixels are so processed that the parameter 28 indicating the pit position (i, j) is determined through the filter 25 for cyan color as shown in FIG. 9b as pixels of the black image data at which cyan dots are to be printed. The resultant output data 41 obtained after the processing with the cyan filter (FIG. 9b) are inputted to one input terminal of the AND circuit 30 and the input image data 20 (FIG. 9a) for black are inputted to the other input terminal to obtain a logical product therebetween. The output data 42 (FIG. 9c) from the AND circuit 30 are used to produce a logical summation with the input image data 21 (FIG.9d) for cyan through the OR circuit 33 as is particularly shown in FIG. 7. As a result, there are obtained output image data 37 as shown in FIG. 9e.

Figures 10A, 10B, 10C, 10D, 10E:
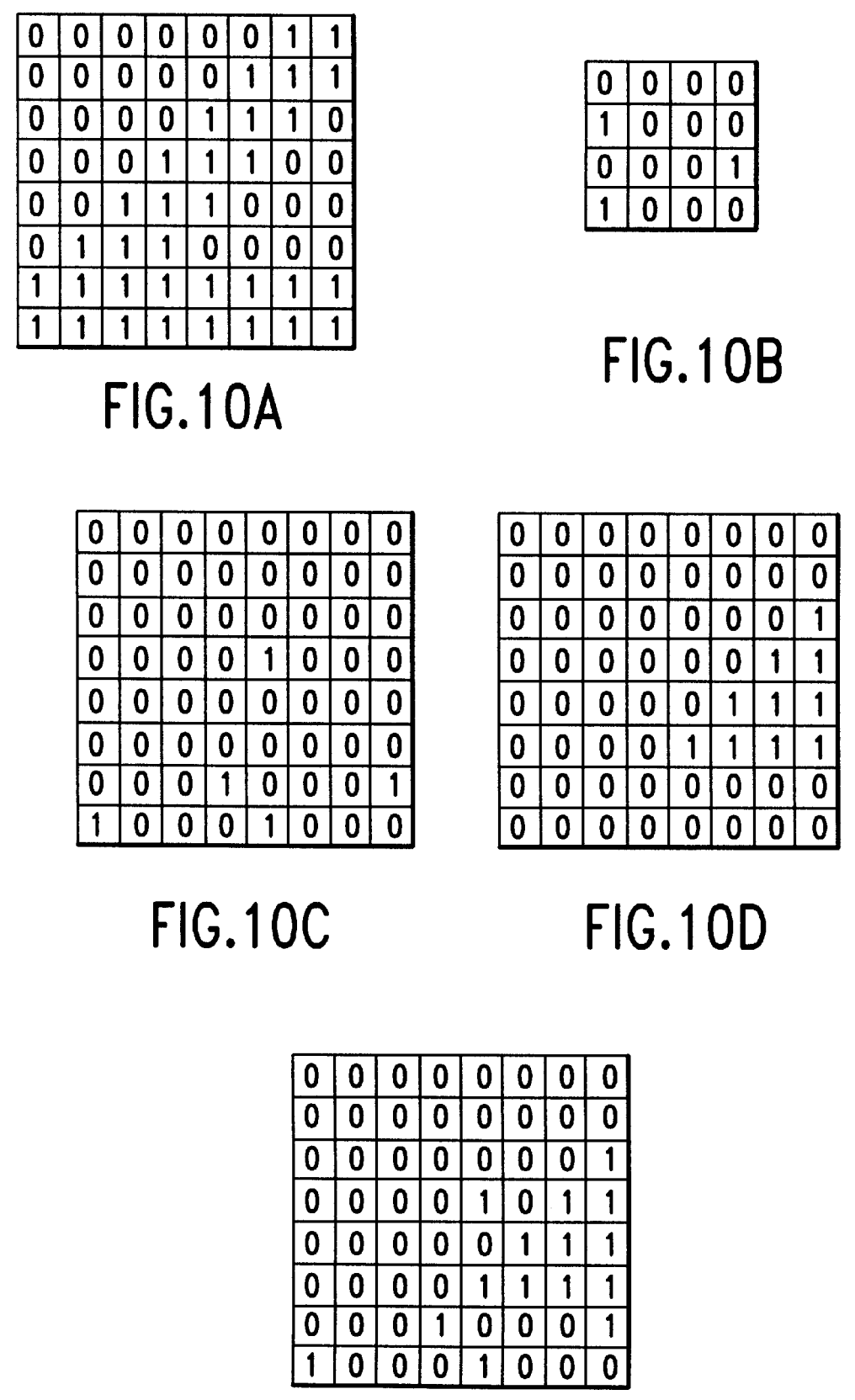

Like the input image data 21 for cyan, a similar image processing is performed with respect to the input image data 22, 23 for magenta and yellow. More particularly, the bit information (i, j) of the input image data is passed through filters 26, 27 for magenta and yellow as shown in FIGS. 10b and 11b, respectively, to determine portions to be printed with magenta and yellow dots among the image data of black. The output data 43 or 44 (FIG. 10b or 11b) obtained by processing through the filter 26 or 27 for magenta and yellow is, respectively, inputted to one input terminal of the AND circuit 31 or 32, and the input image data 20 (FIG. 10a or 11a) is inputted to the other input terminal of the AND circuit 31 or 32 to obtain a logical product therebetween. The output data 45 or 46 (FIG. 10c or 11c) of the AND circuit 31 or 32 is passed to the OR circuit 34 or 35, respectively, wherein a logical summation is produced along with the input image data 22 or 23 for magenta or yellow (FIG. 10d or 11d). Thus, output image data 38 or 39 for magenta or yellow is obtained as shown in FIG. 10e or 11e, respectively.

The respective input image data 20 for black shown in FIG. 8b are subjected to image processing in the color image processing apparatus in the following manner. The input image data 20 for black having 8 pixels×8 pixels are passed through the filter 24 for black as shown in FIG. 12b to obtain portions to be printed with other color dots among the black image data as the parameter indicating the bit position (i, j). The output data 47 (FIG. 12b) processed with the filter for black are inputted to one input terminal of the AND circuit 29 and are used to give a logical product with the input image data 20 (FIG. 12a) for black inputted to the other input terminal of the AND circuit 29. The output data from the AND circuit 29 are outputted as they are as output image data 36 for black as shown in FIG. 7, thereby obtaining output image data for black as shown in FIG. 12c.

Thus, the image data 36 to 39 which have been appropriately image-processed by means of the color image processing apparatus are obtained. These output image data 36 to 39 for black, cyan, magenta and yellow are, respectively, applied to the corresponding color printing units 1a, 1b, 1c and 1d of the printing head 1 at predetermined timings, so that a color image as shown in FIG. 13a is printed on the printing sheet 2 in the form of ink dots.

By the above processing, the image to be printed with a black ink K having a low infiltration rate can be printed with a combination of the black ink K with a color ink C, such as a cyan ink, having a high infiltration rate. Accordingly, the black ink K and the color ink C are mingled to facilitate the infiltration rate of the inks at the black ink print portion, so that the ink bleeding at the boundary between the black ink print portion and other color ink print portion can be suppressed. Thus, there can be provided color image processing method and apparatus whereby there can be printed images which are substantially free of the mingling and bleeding between black and other color inks.

Since there is used a black ink, whose infiltration rate is low, in combination with a color ink or inks whose infiltration rate is higher than that of the black ink, the resultant image printed on ordinary paper has a high black intensity with a sharp edge.

The second embodiment of the invention is described.

FIG. 14 shows a color image processing method according to another embodiment of the invention wherein like reference numerals indicate like parts or members unless otherwise indicated. In this embodiment, the image processing of input image data is not effected by a hard circuit arrangement, but effected by a soft ware arrangement.

More particularly, the color image processing apparatus according to this embodiment includes, as shown in FIG. 14, CPU 50, an image memory 51 for memorizing image data for individual colors, a filter memory 52 memorizing filter data corresponding to the respective color images, and ROM 53 memorizing a given program.

In this color image processing apparatus, input image data are subjected to image processing in the following steps.

Figure 15:
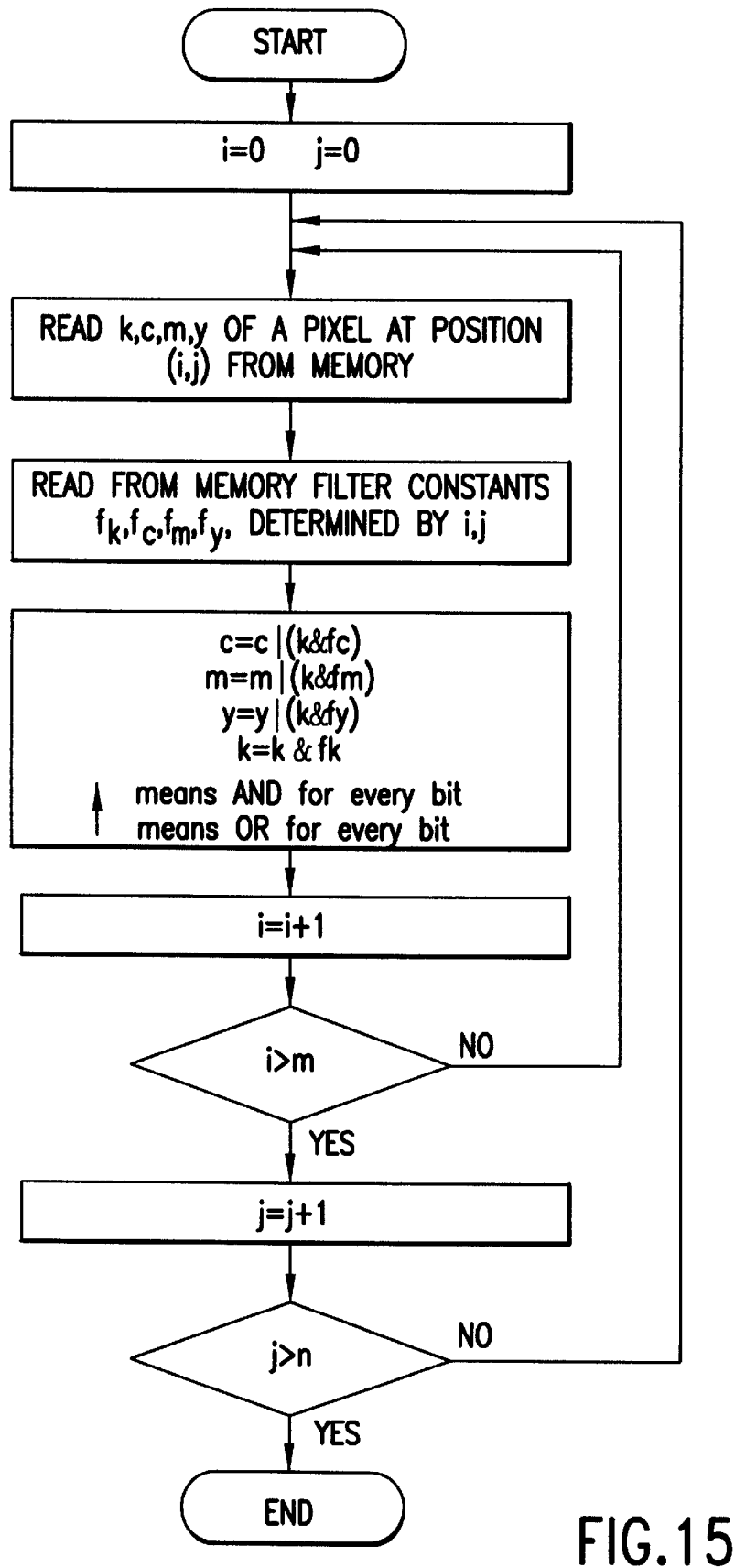
FIG. 15 is a flow chart showing the operation of the apparatus of FIG. 14.

At the commencement of color image processing operations, as shown in FIG. 15, a parameter (i, j) corresponding to a bit of input image data 20 to 23 for black, cyan, magenta and yellow colors is, respectively, set at 0 (step 1). Then, image data k, c, m and y of a pixel at the position (i, j) is read from the image memory 51 (step 2). Subsequently, filter constants $f_k$, $f_c$, $f_m$ and $f_y$ which are, respectively, determined depending on the position (i, j) corresponding to the bit of the input image data 20 to 23 is read from the filter memory 52 (step 3). The filter constants $f_k$, $f_c$, $f_m$ and $f_y$ memorized in the filter memory 52 are, for example, those shown in FIG. 16, wherein the values of image filters for black, cyan, magenta and yellow colors expressed by the hexadecimal number system have been preliminarily recorded in correspondence with a dot matrix consisting of 8 pixel unit.

Subsequently, the CPU 50 operates a logical product (AND) and a logical summation (OR) from the image data k, c, m and y and the filter constants $f_k$, $f_c$, $f_m$ and $f_y$. The results of the operation are successively written in the image memory 51 (step 4), followed by adding 1 to the parameter i (step 5) and judging whether or not the value of i is over a predetermined value, m. If the value of i is over m, 1 is added to the value of j and it is judged whether or not the value of j is over a predetermined value, n, (step 7). When j is below n, the above procedure is repeated.

In this manner, like the first embodiment, there can be obtained output image data 36 to 39 as shown in FIGS. 9d, 10d, 11d and 12c for the respective colors.

In this embodiment, the other arrangement is substantially the same as in the first embodiment and is not described herein.

Figures 17A, 17B:
FIGS. 17a through 17c are, respectively, an illustrative view showing a conversion rule used in a color image processing method according to another embodiment of the invention.
Figure 17C:
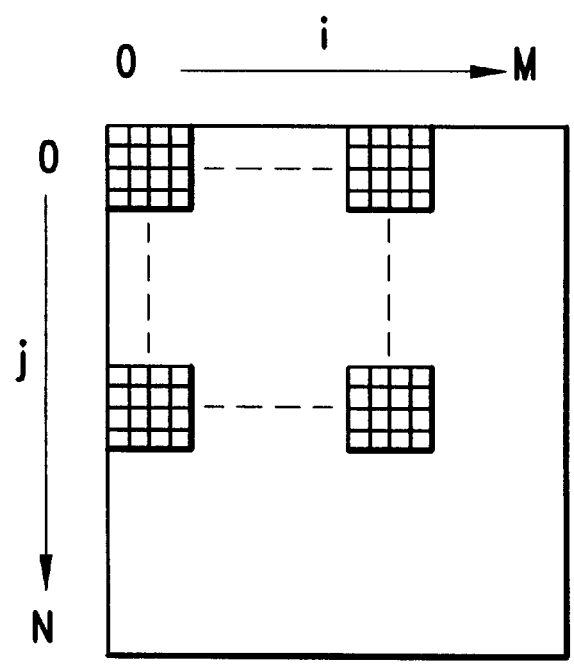
Figure 18B:
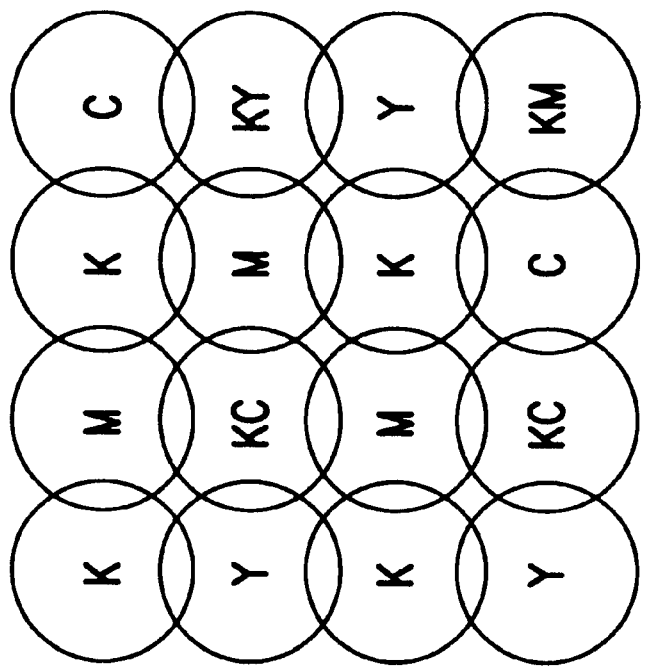
FIGS. 18a and 18b are, respectively, illustrative views showing a print patter of ink dots prior to and after the conversion in the embodiment of FIGS. 17a and 17b.
Figure 18A:
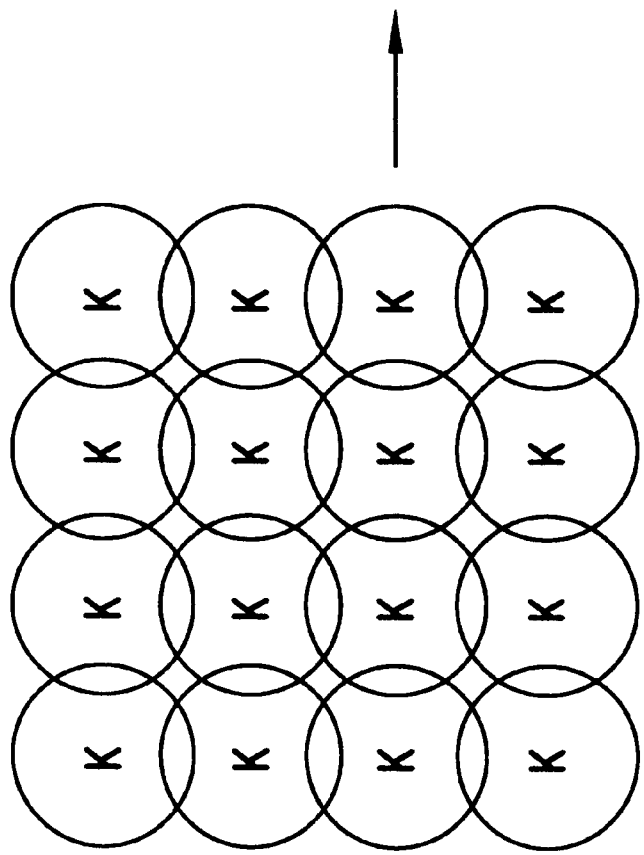

Third embodiment:

FIGS. 17a to 17c show a color image processing method according to a further embodiment of the invention, wherein like reference numerals indicate like parts or members. In the embodiment, there is used a conversion rule wherein a pixel to be printed with a black ink dot is printed with black and other color ink dots being superposed. When a black solid print with a size of four pixels in row and column is converted according to the conversion rule shown in FIGS. 17a to 17c, an input image as shown in FIG. 18a is printed as shown in FIG. 18b.

This conversion can be realized using the hard ware shown in FIG. 7. In the case, there are used 4×4 filters as shown in FIGS. 19a to 19d, respectively. It will be noted that the conversion may be made using the soft ware as shown in FIG. 15.

The conversion procedure of an actual image is described with reference to an image of 8 pixels×8 pixels.

Like the foregoing embodiment, an image 40 of 8 pixels×8 pixels is assumed such that cyan and magenta pixels are divided with black pixels aligned obliquely and horizontally. When the input image data of this color image are resolved into image data 20 to 22 of black, cyan and magenta, the image data 20 to 22 obtained as shown in FIGS. 20b to 20d, respectively. With the image shown in FIG. 20a, there is not any yellow image, so that the input image data 23 corresponding to the yellow color are all "0".

The input image data 20 to 22 for black, cyan and magenta shown in FIGS. 20b to 20d, respectively, are image-processed in the color image processing apparatus as follows.

Figures 21A, 21B, 21C, 21D, 21E:
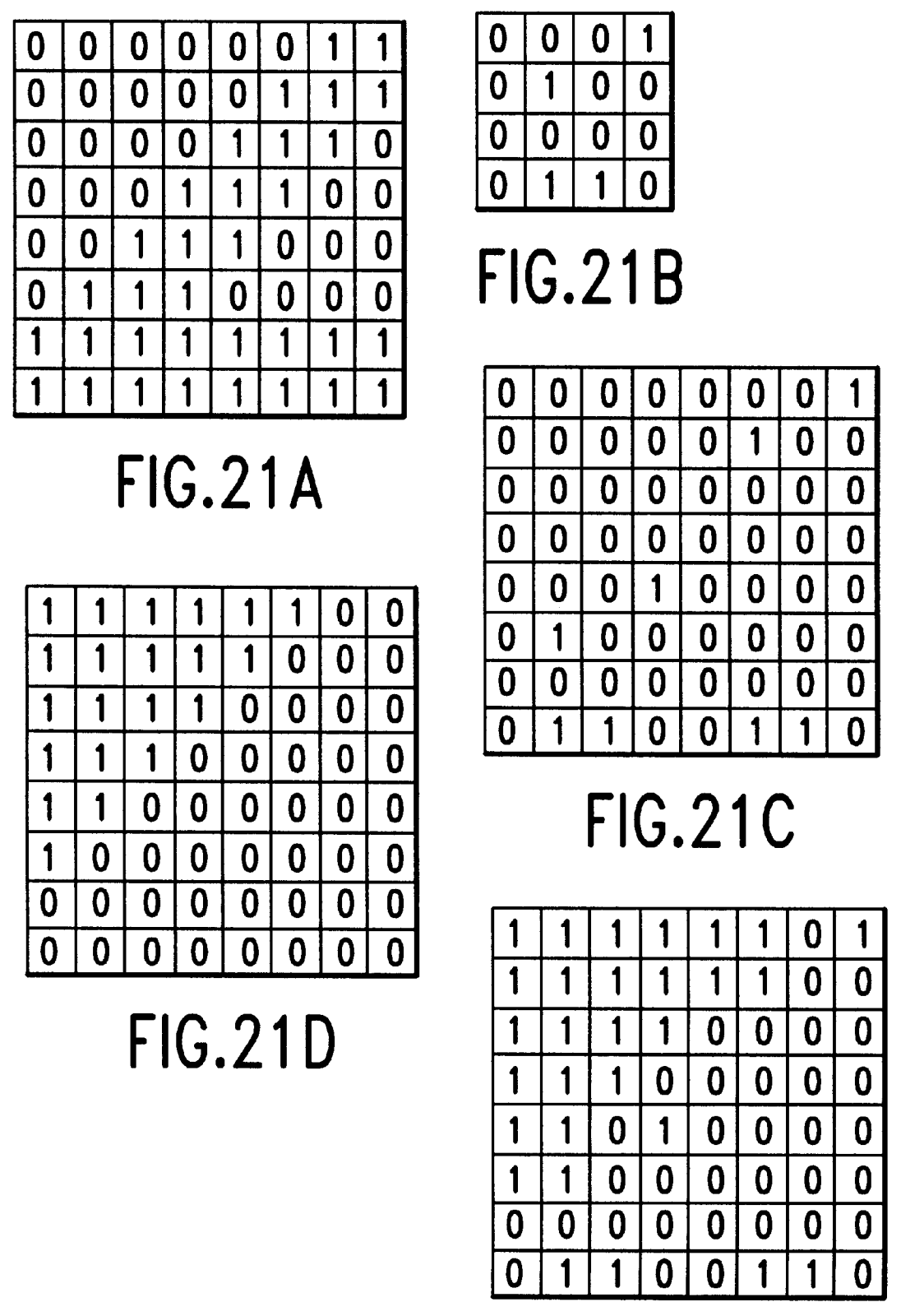

The 8 pixels×8 pixels input image data 21 of cyan are processed through a cyan filter 25 as shown in FIG. 21b so that the parameter 28 indicating a bit position (i, j) is determined as a portion to be printed with a cyan ink dot among the image data of black. The output data 41 which has been obtained after processing with the cyan filter 25 are inputted to one input terminal of the AND circuit 30. Thus, there is obtained a logical product between the output data 41 and the input image data 20 of black inputted to the other input terminal of the AND circuit 30. As shown in FIG. 21d, the output data 42 from the AND circuit 30 produces a logical summation with the input image data 21 for cyan in the OR circuit 33. As a result, the output image data 37 for cyan are obtained as shown in FIG. 21e. The comparison between the output image data 37 for cyan and the output image data 37 shown in FIG. 9e reveals that the regions on which cyan ink dots are to be printed among the black image regions differ from each other.

Like the input image data 21 for cyan, the input image data 22, 23 for magenta and yellow are similarly image-processed. More particularly, the bit information (i, j) of the input image data is, respectively, passed through filters 26, 27 for magenta and yellow as shown in FIGS. 22b and 23b to determine portions to be printed with magenta and yellow dots among the black image data. The output data 43, 44 processed by means of the magenta and yellow filters 26, 27 are, respectively, inputted to one input terminal of the respective AND circuits 31, 32 to obtain a logical product with the black input image data 20 inputted to the other terminal of the respective AND circuits 31, 32. The output data 45, 46 from the AND circuits 31, 32, respectively, produces logical summations with the input image data 22, 23 for magenta and yellow in the OR circuits 34, 35 as shown in FIGS. 22d and 23d. As a result, the output image data 38, 39 for magenta and yellow for cyan are obtained as shown in FIG. 22e and 23e. The comparison between the output image data 38, 39 for magenta and yellow and the output image data 38, 39 shown in FIG. 10e or 11e reveals that the regions on which magenta and yellow ink dots are to be printed among the black image regions differ from each other.

Moreover, the input image data 20 for black shown in FIG. 20b are image-processed in the color image processing apparatus as follows. The 8 pixels×8 pixels input image data 20 for black are processed through a black filter 24 as shown in FIG. 24b so that the parameter 28 indicating a bit position (i, j) is determined as a portion to be printed with other color ink dot among the image data of black. The output data 47 which has been obtained after processing with the black filter 24 are inputted to one input terminal of the AND circuit 29. Thus, there is obtained a logical product between the output data 47 and the input image data 20 of black inputted to the other input terminal of the AND circuit 29. The output data 47 from the AND circuit 29 is outputted as it is as black output image data 36, thus obtaining black output image data 36 as shown in FIG. 24c. It will be noted that the black output image data 36 are the same as the output image data 36 for black shown in FIG. 12c.

Figures 25A, 25B:
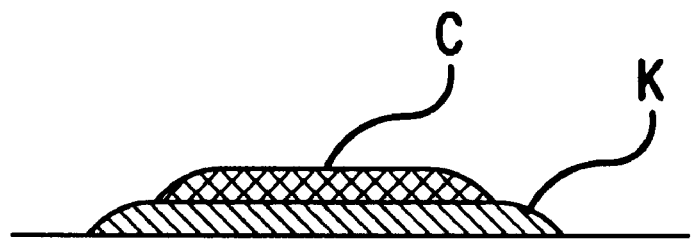
FIGS. 25a and 25b are, respectively, a diagrammatic chart showing printed dots of individual color inks and a schematic view showing a printed state of ink dots being superposed.
Figure 26:
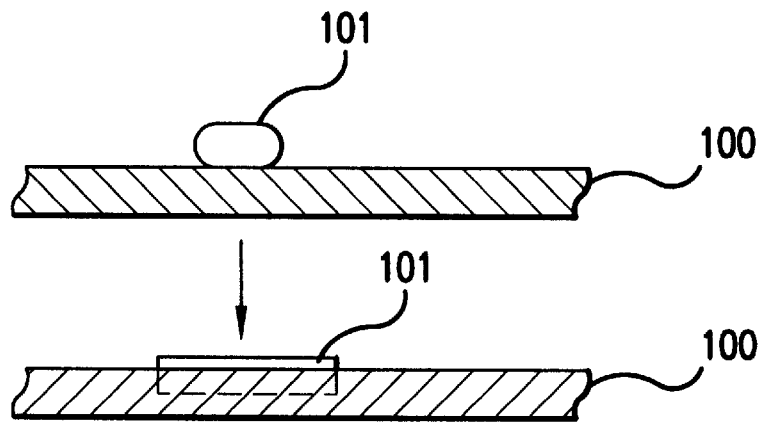
FIG. 26 is a schematic view showing an ink infiltrated in a medium to be printed.
Figure 27A:
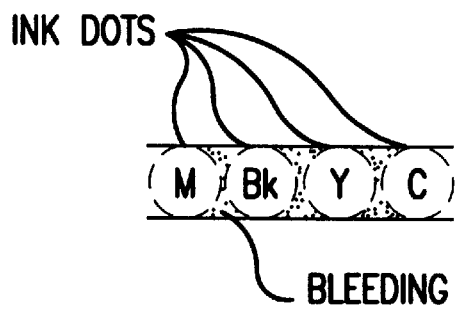
FIGS. 27a and 27b are, respectively, schematic views showing inks infiltrated into a medium to be printed.
Figure 27B:
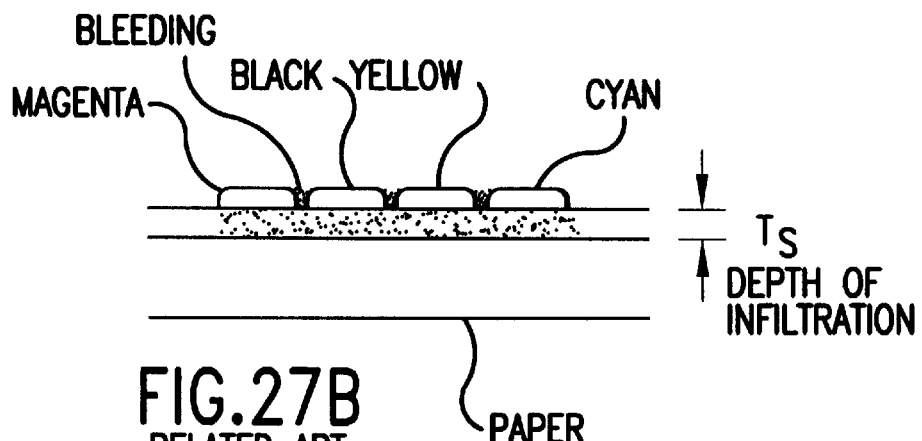
Figure 28A:
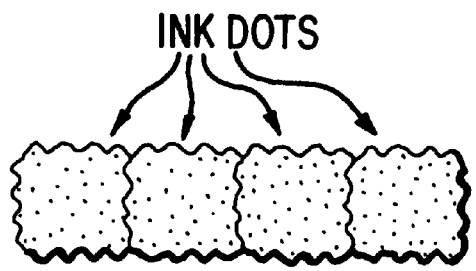
FIGS. 28a and 28b are, respectively, schematic views showing inks infiltrated into a medium to be printed.
Figure 28B:
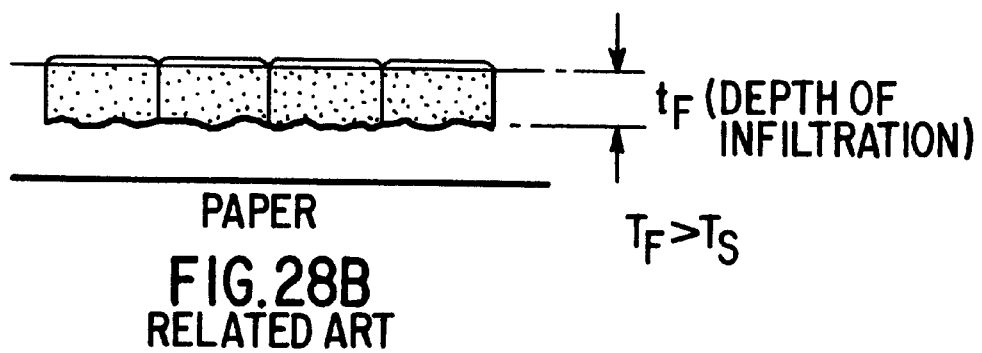
Figure 29:
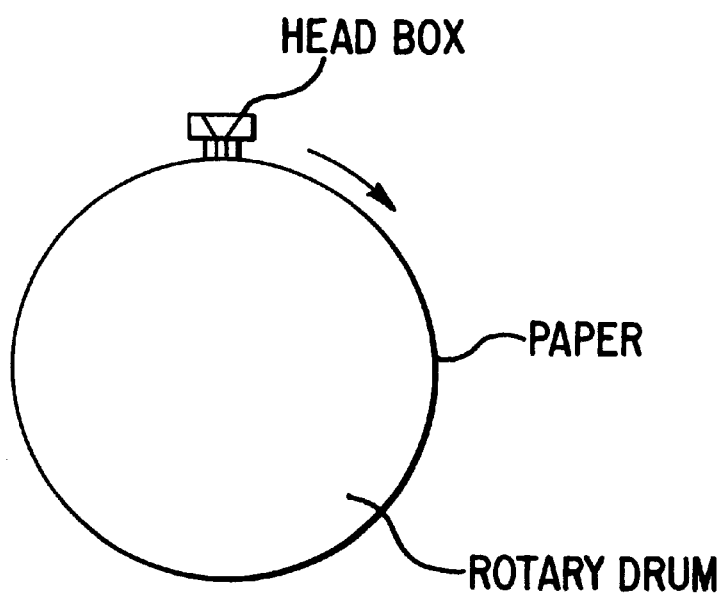
FIG. 29 is a schematic view showing a tester for testing a degree of infiltration of an ink into a medium to be printed.
Figure 30:
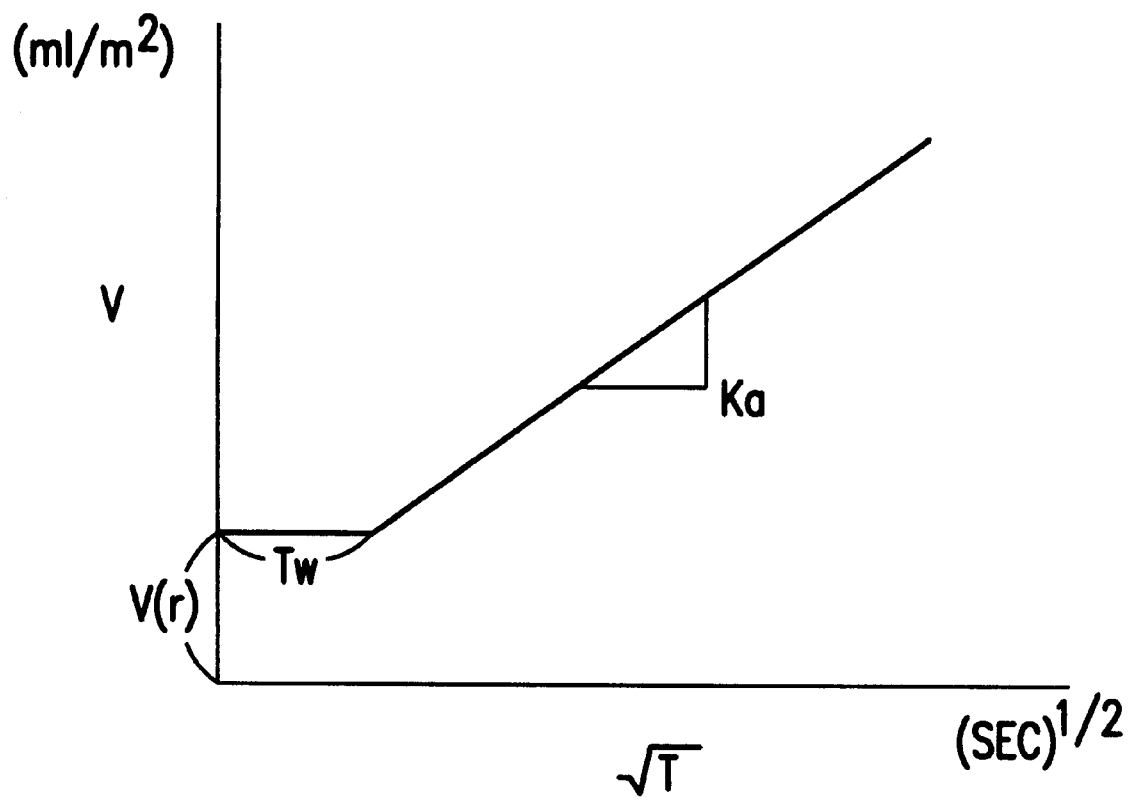
FIG. 30 is a graph showing a characteristic of an ink infiltrated into a medium to be printed.

In this manner, the image data 36 to 39 which have been subjected to image processing in the color image processing circuit are obtained. These output image data 36 to 39 for black, cyan, magenta and yellow are, respectively, applied to corresponding color printing units 1a, 1b, 1c and 1d of the printing head 1 at predetermined timings as shown in FIG. 3, thereby printing a color image made of ink dots as shown in FIG. 25a on a printing sheet 2.

By the processing, an image to be printed with a black ink having a low infiltration rate can be printed, according to the conversion rule of FIGS. 17a to 17c, with a combination of a black ink K having a low infiltration rate and a color ink C, such as a cyan ink, having a high infiltration rate which are superposed one on another. Thus, the ink infiltration rate of the inks at the black print portion can be increased. This results in mitigation of ink bleeding at the boundary between the black ink print portion and the color ink print portion, thereby providing color image processing method and apparatus which ensure printing of images which are free of mingling and bleeding between black and other colors. Since the black ink print portion is not completely replaced by other color ink or inks, a clear black print is obtained even if the black ink print portion is a very narrow line image.

In the foregoing embodiments, the conversion rule shown in FIGS. 1a to 1c is adapted for printing sharp images and the conversion rule shown in FIGS. 17a to 17c is adapted for high print density images. These two conversion rules make it possible to keep high image quality by proper selection of these rules depending on the type of printing paper.

Of course, it is possible to select these processing operations only when a color printing mode is selected in selection means of ink jet printers. The selection means may be set by a user or may be programmed for automatic setting by detecting a header of documents indicating a color document recorded such as in bit map information of the documents.

What is claimed is:

1. A method for processing a color image to be printed utilizing a black ink having a first rate of infiltration into paper and other color inks having a second rate of infiltration into paper, wherein the first rate is lower that the second rate, comprising the steps of:

locating a region of black pixels within the color image; and converting each of at least one individual black pixel in the region of black pixels to at least a single other color pixel so that the at least one converted pixel of the region of black pixels is printed with the at least single other color ink instead of black ink, wherein said black image data are converted into color image data by converting said black image data into a binary number system to develop a dot matrix pattern, passing the thus developed black image data to filter circuits corresponding to black, cyan, magenta and yellow colors, wherein said filter circuits have, respectively, memorized dots to be printed with corresponding colors, and producing logical products and logical summations from the processed data and said black image data thereby obtaining final image data corresponding to the respective black, cyan, magenta and yellow colors.

2. A method according to claim 1, wherein the use of a black ink includes using a black ink that has an absorption coefficient (Ka) of not larger than 0.5 ml/m$^2$.ms$^{1/2}$ and a wetting time (Tw) of from 50 to 200 milliseconds and the use of other color inks includes using other color inks that have an absorption coefficient (Ka) of not larger than 1.0 ml/m$^2$.ms$^{1/2}$ and a wetting time (Tw) of not greater than 20 milliseconds.

3. The method according to claim 1, further comprising the step of selecting at least one black pixel of the color image data for conversion to a single color pixel based on a predetermined pattern.

4. The method according to claim 3, wherein the at least one black pixel is selected without regard for the color of surrounding pixels.

5. The method according to claim 1, wherein the at least single other color ink comprises at least an other color ink and the black ink.

6. A method for processing a color image to be printed utilizing a black ink having a first rate of infiltration into paper and other color inks having a second rate of infiltration into paper, wherein the first rate is lower that the second rate, comprising the steps of:

locating a region of black pixels within the color image; and converting each of at least one individual black pixel in the region of black pixels to at least a single other color pixel so that the at least one converted pixel of the region of black pixels is printed with the at least single other color ink instead of black ink, wherein the image processing procedure comprises:

setting a parameter (i,j), wherein i indicates a dot position in row and j indicates a dot position in column, corresponding to a binary bit of individual input image data for black, cyan, magenta and yellow at zero;

reading image data for the respective colors at pixels of the position (i,j);

reading filter constants for the respective colors which are determined by the position (i,j) corresponding to the binary bits of said input image data;

operating logical products and logical summations from the image data and the filter constants for the respective colors;

writing the logical products and the logical summations in an image memory;

adding 1 to the parameter i;

judging whether or not the parameter i is over a predetermined value wherein when the parameter i is over the predetermined value, 1 is added to a parameter j after which it is judged whether the parameter j is over a predetermine value; and repeating the above procedure when the parameter j is below the second-mentioned value whereby output image data for the respective colors are obtained.

7. The method according to claim 6, wherein the at least single other color ink comprises at least an other color ink and the black ink.

8. An apparatus for processing a color image to be printed utilizing a black ink having a first rate of infiltration into paper and other color inks having a second rate of infiltration into paper which is higher that the first rate, comprising image data conversion means for locating a region of black pixels within the color image and for converting at least one black pixel in the region of black pixels into an other color pixel so that the converted at least one pixel can be printed by at least one other color ink droplet instead of at least one black ink droplet, said conversion means comprising:

means for converting input image data for black, cyan, magenta and yellow colors into a dot matrix whose dot position is indicated by (i,j) wherein i indicates a dot position in row and j indicates a dot position in column;

four filter means for black, cyan, magenta and yellow colors wherein a filter means for black memorizes dots printed by an other color, a filter means for cyan memorizes dots printed by a cyan color among black dots, a filter means for magenta memorizes dots printed by a magenta color among black dots, and a filter means for yellow memorizes dots printed by a yellow color among black dots; and an AND circuit corresponding to the filter means for black, and AND and OR circuits corresponding to the filter means for cyan, magenta and yellow to produce a logical product and a logical summation for each color thereby obtaining output image data for black, cyan, magenta and yellow colors.

9. An apparatus according to claim 8, further comprising selection means for selecting the at least one black pixel for conversion to a color pixel according to a predetermined pattern.

10. An apparatus according to claim 9, wherein the selection means selects the at least one black pixel without regard for the color of surrounding pixels.

11. The apparatus according to claim 8, wherein the at least one other color ink droplet is in addition to the at least one black ink droplet.

12. An apparatus for processing a color image to be printed utilizing a black ink having a first rate of infiltration into paper and other color inks having a second rate of infiltration into paper which is higher that the first rate, comprising image data conversion means for locating a region of black pixels within the color image and for converting at least one black pixel in the region of black pixels into an other color pixel so that the converted at least one pixel can be printed by at least one other color ink droplet instead of at least one black ink droplet, said conversion means comprises:

an image memory for memorizing individual color image data;

a filter memory for memorizing filter data for the respective color image;

a CPU for operating logical products and logical summations from said individual color image data and filter constants memorized in said filter memory, and ROM for carrying out the steps of setting a parameter (i,j), wherein i indicates a dot position in row and j indicates a dot position in column, corresponding to a binary bit of individual input image data for black, cyan, magenta and yellow at zero, reading image data for the respective colors at pixels of the position (i,j) from said image memory, reading filter constants for the respective colors from said filter memory which are determined by the position (i,j) corresponding to the binary bits of said input image data, operating logical products and logical summations from the image data and the filter constants for the respective colors by means of said CPU and writing the logical products and the logical summations in said image memory, adding 1 to the parameter i, judging whether the parameter i is over a predetermined value, and when the parameter is over the predetermined value, 1 is added to a parameter j after which it is judged whether the parameter j is over a predetermined value, and repeating the above procedure when the parameter j is below the second-mentioned value whereby output image data for the respective colors are obtained.

13. The apparatus according to claim 12, wherein the at least one other color ink droplet is in addition to the at least one black ink droplet.

14. A method for processing a color image to be printed utilizing a black ink having a first rate of infiltration into paper and other color inks having a second rate of infiltration into paper, wherein the first rate is lower that the second rate, comprising the steps of:

locating a region of black pixels within the color image; and converting black pixel image data in the region of black pixels into black and an other color pixel image data according to a predetermined pattern so that at least one pixel of the region of black pixels that would have been printed with at least one black ink droplet is instead printed with both at least one black ink droplet and at least one other color ink droplet, wherein said black image data are converted into color image data by converting said black image data into a binary number system to develop a dot matrix pattern, passing the thus developed black image data to filter circuits corresponding to black, cyan, magenta and yellow colors wherein said filter circuits have, respectively, memorized dots to be printed with corresponding colors, and producing logical products and logical summations from the processed data and said black image data thereby obtaining final image data corresponding to the respective black, cyan, magenta and yellow colors.

15. An apparatus for processing color images that are to be printed utilizing a black ink having a first rate of infiltration into paper and other color inks having a second rate of infiltration into the paper which is higher than the first rate, comprises image data conversion means for locating a region of black pixels within the color image and for converting black pixel image data in the region of black pixels into black and color pixel image data according to a predetermined pattern so that at least one pixel of the region of black pixels that would have been printed with at least one black ink droplet is instead printed with both at least one black ink droplet and at least one color ink droplet, said image data conversion means comprising:

means for converting input image data for black, cyan, magenta and yellow colors into a dot matrix whose dot position is indicated by (i,j) wherein i indicates a dot position in row and j indicates a dot position in column;

four filter means for black, cyan, magenta and yellow colors wherein a filter means for black memorizes dots printed by an other color, a filter means for cyan memorizes dots printed by a cyan color among black dots, a filter means for magenta memorizes dots printed by a magenta color among black dots, and a filter means for yellow memorizes dots printed by a yellow color among black dots; and an AND circuit corresponding to the filter means for black, and AND and OR circuits corresponding to the filter means for cyan, magenta and yellow to produce a logical product and a logical summation for each color thereby obtaining output image data for black, cyan, magenta and yellow colors.

16. A method for processing a color image to be printed utilizing a black ink having a first rate of infiltration into paper and other color inks having a second rate of infiltration into paper, wherein the first rate is lower that the second rate, comprising the steps of:

locating a region of black pixels within the color image; and converting black pixel image data in the region of black pixels into black and other color pixel image data according to a predetermined pattern so that at least one pixel of the region of black pixels that would have been printed with at least one black ink droplet is instead printed with both at least one black ink droplet and at least one other color ink droplet, wherein the converting black image pixel data step comprises:

setting a parameter (i,j), wherein i indicates a dot position in row and j indicates a dot position in column, corresponding to a binary bit of individual input image data for black, cyan, magenta and yellow at zero;

reading image data for the respective colors at pixels of the position (i,j);

reading filter constants for the respective colors which are determined by the position (i,j) corresponding to the binary bits of said input image data;

operating logical products and logical summations from the image data and the filter constants for the respective colors;

writing the logical products and the logical summations in an image memory;

adding 1 to the parameter i;

judging whether the parameter i is over a predetermined value wherein when the parameter i is over the predetermined value, 1 is added to a parameter j after which it is judged whether the parameter j is over a predetermine value; and repeating the above procedure when the parameter j is below the second-mentioned value whereby output image data for the respective colors are obtained.

17. An apparatus for processing color images that are to be printed utilizing a black ink having a first rate of infiltration into paper and other color inks having a second rate of infiltration into the paper which is higher than the first rate, comprises image data conversion means for locating a region of black pixels within the color image and for converting black pixel image data in the region of black pixels into black and other color pixel image data according to a predetermined pattern so that at least one pixel of the region of black pixels that would have been printed with at least one black ink droplet is instead printed with both at least one black ink droplet and at least one other color ink droplet, said image data conversion means comprises:

an image memory for memorizing individual color image data;

a filter memory for memorizing filter data for the respective color image;

a CPU for operating logical products and logical summations from said individual color image data and filter constants memorized in said filter memory; and a ROM for carrying out the steps of setting a parameter (i,j), wherein i indicates a dot position in row and j indicates a dot position in column, corresponding to a binary bit of individual input image data for black, cyan, magenta and yellow at zero, reading image data for the respective colors at pixels of the position (i,j) from said image memory, reading filter constants for the respective colors from said filter memory which are determined by the position (i,j) corresponding to the binary bits of said input image data, operating logical products and logical summations from the image data and the filter constants for the respective colors by means of said CPU and writing the logical products and the logical summations in said image memory, adding 1 to the parameter i, judging whether the parameter i is over a predetermined value, and when the parameter is over the predetermined value, 1 is added to a parameter j after which it is judged whether the parameter j is over a predetermined value, and repeating the above procedure when the parameter j is below the second-mentioned value whereby output image data for the respective colors are obtained.

* * * * *